(12) United States Patent
Dumont et al.

(10) Patent No.: US 10,378,953 B2
(45) Date of Patent: Aug. 13, 2019

(54) METHODS FOR GUIDING PERSONAL LIMIT SELECTION IN UV DOSIMETRY

(71) Applicant: YouV Labs, Inc., New York, NY (US)

(72) Inventors: Emmanuel Dumont, New York, NY (US); Shayak Banerjee, Hartsdale, NY (US)

(73) Assignee: YouV Labs, Inc., New York, NY (US)

( * ) Notice: Subject to any disclaimer, the term of this patent is extended or adjusted under 35 U.S.C. 154(b) by 0 days.

(21) Appl. No.: 15/996,231

(22) Filed: Jun. 1, 2018

(65) Prior Publication Data

US 2019/0033126 A1  Jan. 31, 2019

Related U.S. Application Data

(60) Provisional application No. 62/513,821, filed on Jun. 1, 2017.

(51) Int. Cl.
*A61N 5/06* (2006.01)
*G01J 1/02* (2006.01)
*G01J 1/42* (2006.01)

(52) U.S. Cl.
CPC ............. *G01J 1/0219* (2013.01); *G01J 1/429* (2013.01); *G01J 2001/0257* (2013.01)

(58) Field of Classification Search
CPC ..... G01J 1/0219; G01J 1/429; G01J 2001/0257
See application file for complete search history.

(56) References Cited

U.S. PATENT DOCUMENTS

| | | | |
|---|---|---|---|
| 2010/0173865 A1* | 7/2010 | Klostergaard | A61K 47/61 514/54 |
| 2015/0238774 A1* | 8/2015 | Anderson | A61F 13/00063 604/20 |
| 2016/0363479 A1* | 12/2016 | Dumont | G01J 1/0271 |
| 2017/0225006 A1* | 8/2017 | Anderson | A61N 5/06 |
| 2018/0080818 A1* | 3/2018 | Tiwari | G01J 1/0219 |

\* cited by examiner

*Primary Examiner* — Munear T Akki
(74) *Attorney, Agent, or Firm* — Shay Glenn LLP

(57) ABSTRACT

A computer executable method that can be stored in a memory, the method including: visually presenting on a display of a user device a history of UV dose that was calculated based on information sensed by a UV sensor in a wearable UV sensing device; visually presenting a percentile indicator on the display, the percentile indicator being indicative of a calculated percentile of the history of UV dose; and visually presenting on the display a user-adjustable UV dose threshold interface that is adapted to allow the user to interact with the user-adjustable UV dose interface and choose a user-chosen UV dose threshold quantity.

5 Claims, 21 Drawing Sheets

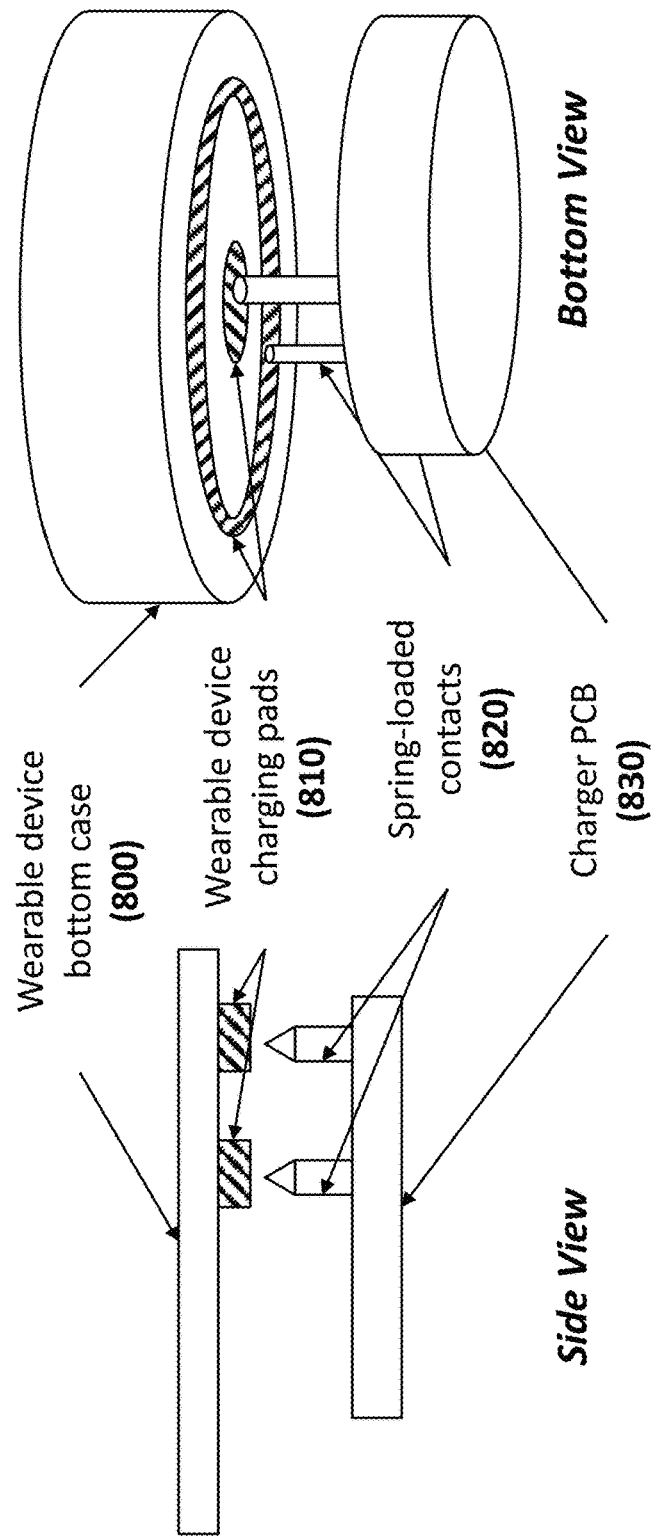

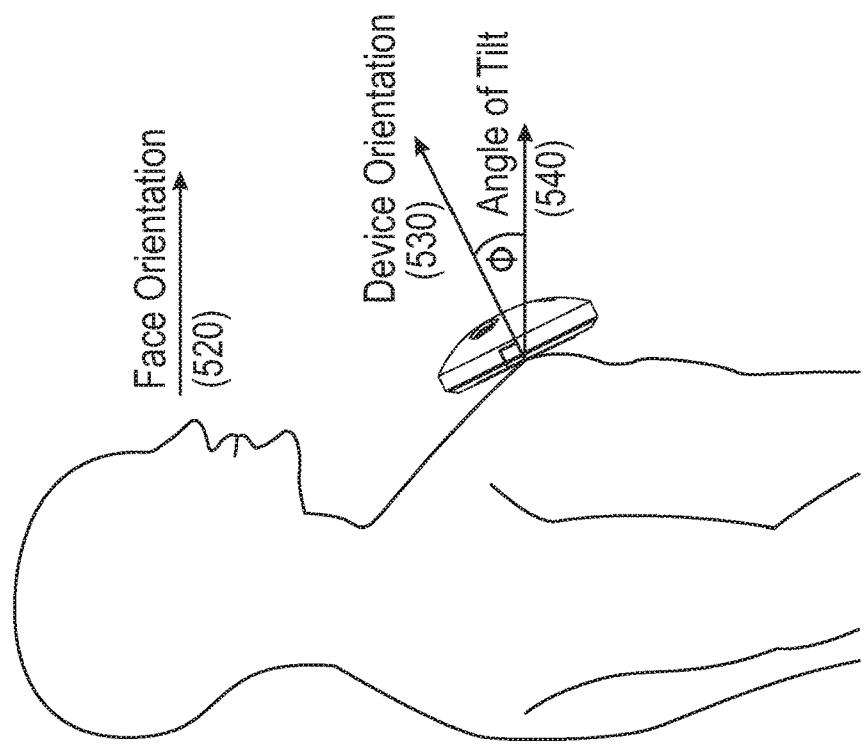
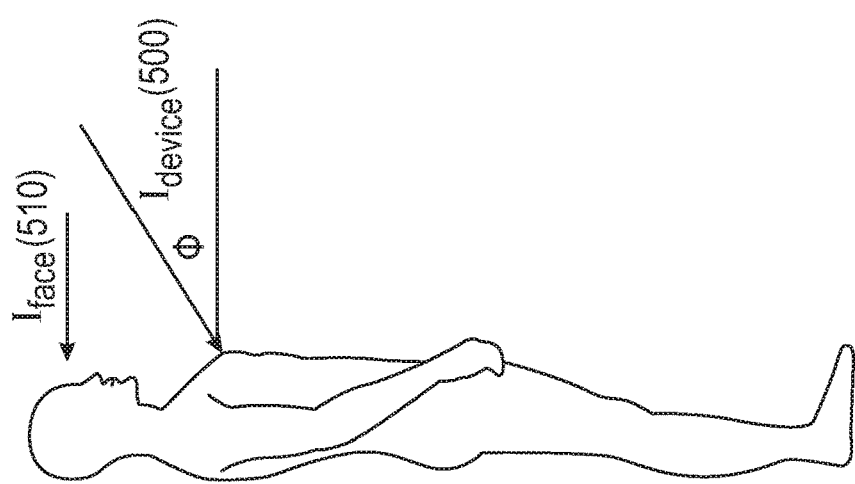
Figure 12A
Figure 12B

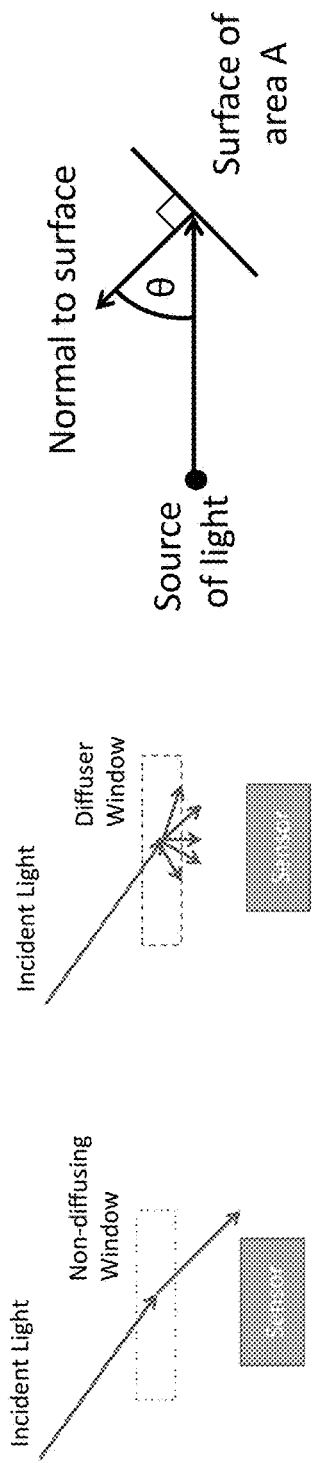
Figure 14(a)(i)
Figure 14(a)(ii)
Figure 14(b)
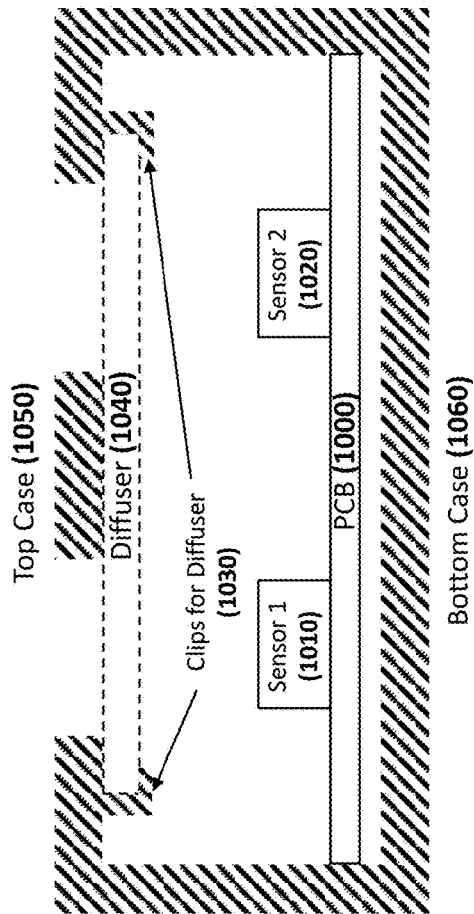
Figure 15

METHODS FOR GUIDING PERSONAL LIMIT SELECTION IN UV DOSIMETRY

CROSS REFERENCE TO RELATED APPLICATIONS

This application claims the benefit of U.S. Provisional Application No. 62/513,821 filed Jun. 1, 2017.

This application is related to and incorporates by reference herein the entire disclosure of U.S. Pat. App. Pub. 2016/0364131A1 to Dumont et al. Any aspect of any of the devices, systems, and methods described in U.S. Pat. App. Pub. 2016/0364131A1 can be incorporated into any of the embodiments herein.

BACKGROUND

This disclosure relates to managing ultraviolet (UV) radiation that a person is exposed to using a UV-measuring device. A system attempting to perform such measurements has previously been proposed [1]. It includes a wearable device that measures UV exposure and where the exposure data can be displayed to the user, either on the wearable device or on a remote mobile device (such as a smartphone or tablet) through a wireless transmission. Two important data are UV exposure and UV dose. UV exposure represents the instantaneous strength of UV radiation (usually in units of power or power per unit surface), while UV dose is the aggregated strength of UV radiation over a specified time period (usually in units of energy or energy per unit surface). One of the foundations of the exemplary system is the selection of a limit for UV dose that a user wishes to remain under over a specific period of time (usually during a day, which we will use thereafter but it could be an hour, a week, a month, etc.). In this disclosure, we describe several aspects or features of exemplary systems that provide guides to the user about setting this daily limit.

Why Would Users Measure their Exposure to UV Radiation?

Ultraviolet ("UV") light is radiation in the wavelength range of 280-400 nm. Most of people receive their UV exposure from sunlight but some may be exposed to artificial UV exposure during their work (e.g. nurses) or for aesthetic purposes (e.g. tanning bed). UV exposure enables the skin to synthesize Vitamin D but overexposure to UV can cause adverse effects such as: skin redness, sunburn, systemic reactions in autoimmune diseases such as lupus, or pharmaceutical phototoxicity in the short term, and non-melanoma and melanoma skin cancer, skin aging, pharmaceutical photoallergy, photogenotoxicity, and photocarcinogenicity in the longer term (adverse effects thereafter).

Everyone has a Different Sensitivity to UV Exposure

Sensitivity to UV varies from person to person. Factors influencing UV sensitivity are comprised of genetic factors, history of UV exposure, concomitant medications, and medical conditions. For instance, on average, people with darker skin are more tolerant to UV exposure than people with fair skin. However, people with dark skin suffering from lupus are as sensitive, if not more, to UV exposure than people with fair skin. There is no way, a priori, to determine what daily UV dose a person can be exposed to without experiencing adverse events.

Lifestyle Greatly Influences how much UV Exposure a User Receives Everyday

On average, people living in tropics will receive a higher daily UV dose on average than people living in the middle latitudes because the UV exposure is higher, on average, in the tropics than in the middle latitudes. Similarly, people walking in direct sunlight will receive a higher UV dose than people walking in the shade in a nearby location.

Time spent outdoors varies from individual to individual. Outdoor runners spend more time outside during their exercise than indoor treadmill runners. Certain professions, such as construction, involve a longer time being outside on a daily basis, compared to office jobs for instance.

As result, the UV dose received by someone depends on both the UV strength and the time spent at the corresponding UV strength, two factors that heavily depend on someone's location and lifestyle.

Under such circumstances, the primary way to be able to control any adverse event caused by UV overexposure is to have an accurate knowledge of one's real-time UV dose and, as importantly, relate it to a limit that makes sense for this specific person so that she or he can avoid any adverse event by making sure her or his UV dose remains under this limit.

This is what is achieved by the proposed exemplary systems and methods, where the wearable device measures UV exposure and aggregates it to compute the UV dose, while the mobile device displays a UV dose limit to the user based on this information.

How to Measure Solar UV Exposure in a Way Relevant to Human Health?

In 1987, the human sensitivity to ultraviolet radiation was defined by Diffey and later adopted by the World Meteorological Organization and the World Health Organization [21]. This sensitivity is called the erythema action spectrum and gives exponentially more importance to high-energy photons. When measured on a horizontal surface, this standard metric is called the ultraviolet index (UV Index, or UVI). What impacts human health is the integration of UV exposure over time, referred to herein as the UV dose. When the UV exposure is weighted according to the erythema action spectrum, the accumulated dose is called the "erythemal dose".

Typical UV measuring systems include a UV detector, which converts the incident ultraviolet radiation signal to electric current, coupled with additional circuitry. This includes an analog-to-digital converter (ADC), op-amp and microcontroller [1]. The current is then converted into a value for the UV index using a reference value of Some examples of these systems are the Solarmeter 6.5 UVI and the Genicom UV Index Meter. While such a system is capable of estimating the UVI, it is not accurate in a wide variety of situations because of the mismatch between their spectral sensitivity and the erythema spectrum [17, 20].

Why is it Important to Set a Personal Limit of UV Dose?

Every person has a certain UV dose they can tolerate in a given time span before it has an adverse effect. For some, depending on their location, this limit is small enough to be achieved in a few minutes to a few hours. If the UV dose limit is being approached, or has been exceeded, this information needs to be conveyed to the user so that he/she can act on it immediately. Otherwise it can lead to adverse effects. It is for instance known that UV exposure has a systemic impact on lupus and evidence shows that lupus patients experience more flares in the summer than in the winter [23]. Once a UV dose limit is set, a user may be notified when they have exceeded a certain percentage of that limit (e.g. 50%) by one of several methods e.g. a vibration, sound or light on either the UV sensor or the connected mobile device. There may be inventive aspects of this disclosure that do not rely on a real-time system. While real-time information has advantages that are called out herein, it is not necessarily an essential feature of every device, system, or method disclosed herein.

The state of the art in UV dosimetry recommends a UV dose based on skin type. These recommendations do not take into account the history of UV exposure, which influences the tolerance to UV dose, concomitant medications, and diseases. As a result, this method can lead to inappropriate UV dose limits for many users, and a result, lead to adverse events.

SUMMARY OF THE DISCLOSURE

In this disclosure, we describe methods and devices for guiding the user in setting a limit for their UV dose. The guiding, or assisting, can include providing additional information to the user. The limit may be based on a pre-set period of time e.g. an hour or a day. The user is guided to set a limit based on a display of a history of previous doses, and in some embodiments a history of self-recorded symptoms or health reports. Examples of systems, devices, and methods that allow a user to set a personal UV dose limit based on a dose history and symptom history are included herein in reference to FIGS. 1-22, which are also included in U.S. Pat. App. Pub. 2016/0364131A1. In some embodiments herein, the user is provided with further guides or additional information as to what is a high UV dose by displaying on the graph (or other visual presentation) a certain percentile of their UV history (for example, without limitation, the 90th percentile), as computed over the past UV dose history. This guide or other additional information can be displayed on the graph visually in the form of, for example, a region or a line (algorithms can of course be adapted to visually indicate this information in other ways), indicating a potentially dangerous high UV dose. This additional information allows the user to be better informed while setting (also referred to herein as "choosing" or "selecting") their UV dose limit.

One aspect of the disclosure is a computer executable method adapted to be stored in a memory, comprising: visually presenting on a display of a user device a history of UV dose that was calculated based on information sensed by a UV sensor in a wearable UV sensing device; visually presenting a percentile indicator on the display, the percentile indicator being indicative of a calculated percentile of the history of UV dose. The method can also include visually presenting on the display a user-adjustable UV dose threshold interface that is adapted to allow the user to interact with the user-adjustable UV dose interface and choose a user-chosen UV dose threshold quantity.

The history of UV dose can be visually presented in graph form.

The percentile indicator can be visually overlaid with the history of UV dose.

The user-adjustable UV dose threshold interface can be visually overlaid with the history of UV dose. The percentile indicator can be overlaid with the user-adjustable UV dose threshold and the history of UV dose.

The percentile indicator can indicate to the user doses on the history of UV dose that are at least one of at or above the calculated percentile.

The user-adjustable UV dose threshold interface can be adapted to change visually if the user-adjustable UV dose threshold interface is moved to a dose that is at least one of at or above the calculated percentile.

The percentile indicator can indicate to the user doses on history of UV dose that are at least one of at or below the calculated percentile.

The percentile indicator can comprise at least one of a horizontal line, a shaded area, and a colored area.

The history of UV dose can be broken up into epochs of time, optionally, days, weeks, or months.

One aspect of the disclosure is a computer executable method adapted to be stored in a memory, the method comprising: visually presenting on a display of a user device a percentile indicator indicative of a calculated percentile of a UV dose history that was calculated based on information sensed by a UV sensor in a UV sensing device.

The method can further include visually presenting on the display a history of UV dose that was calculated based on information sensed by a UV sensor in a wearable UV sensing device.

The method can further comprise visually presenting on the display a user-adjustable UV dose threshold interface that is adapted to allow the user to choose a user-chosen UV dose threshold quantity.

One aspect of the disclosure is a computer executable method adapted to be stored in a memory, the method comprising: receiving as input a UV dose history that was calculated based on information sensed by a UV sensor in a UV sensing device; calculating a percentile of the UV dose history (e.g., 90%), and communicating as output to a display the calculated percentile of the UV dose history. The method can further comprise visually presenting on a display of a user device a percentile indicator indicative of the calculated percentile of the UV dose history that was calculated based on information sensed by a UV sensor in a UV sensing device.

Figure 4:
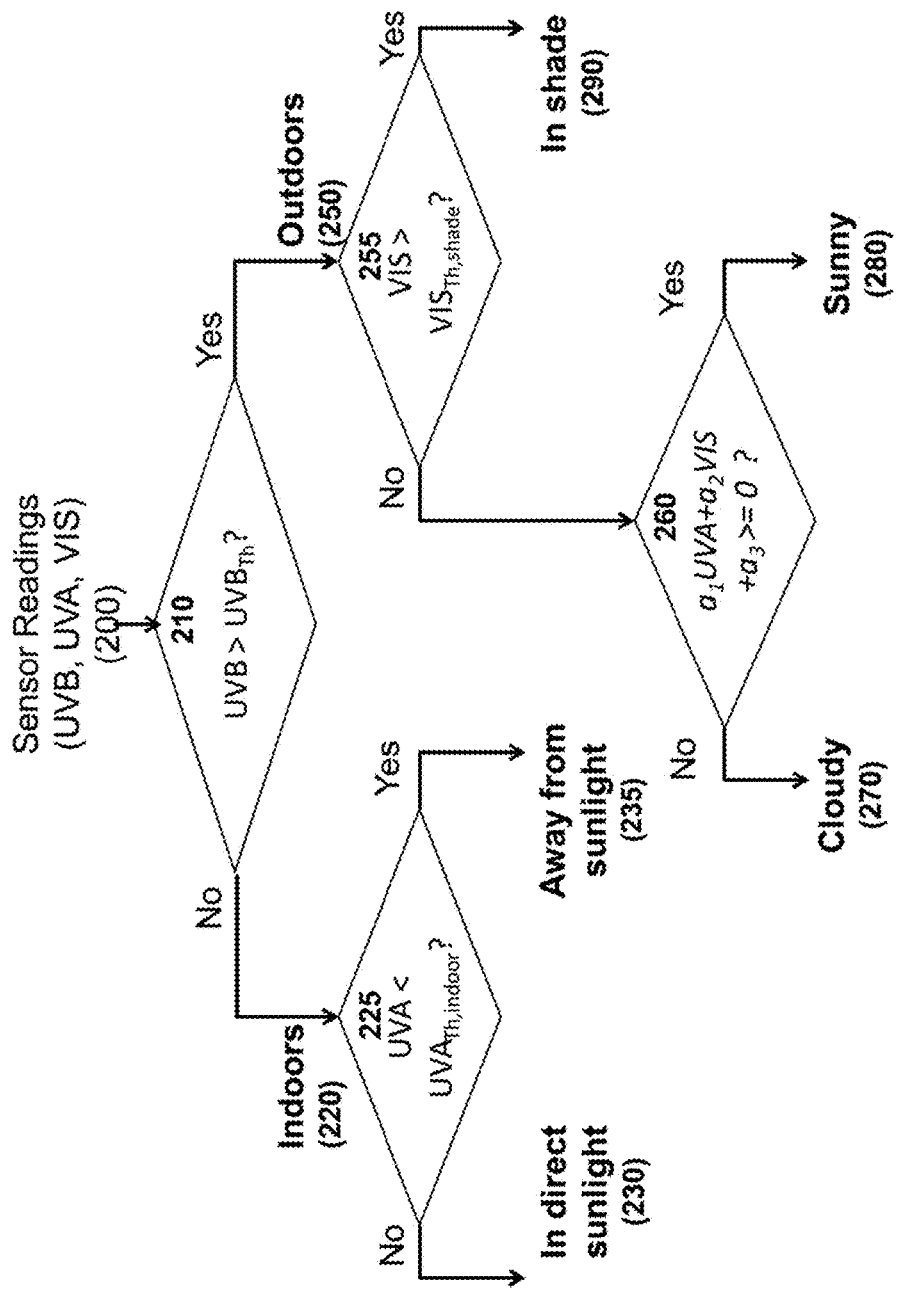

An exemplary algorithm for determining the environment based on sensor readings is shown in FIG. 4.

Figure 5:
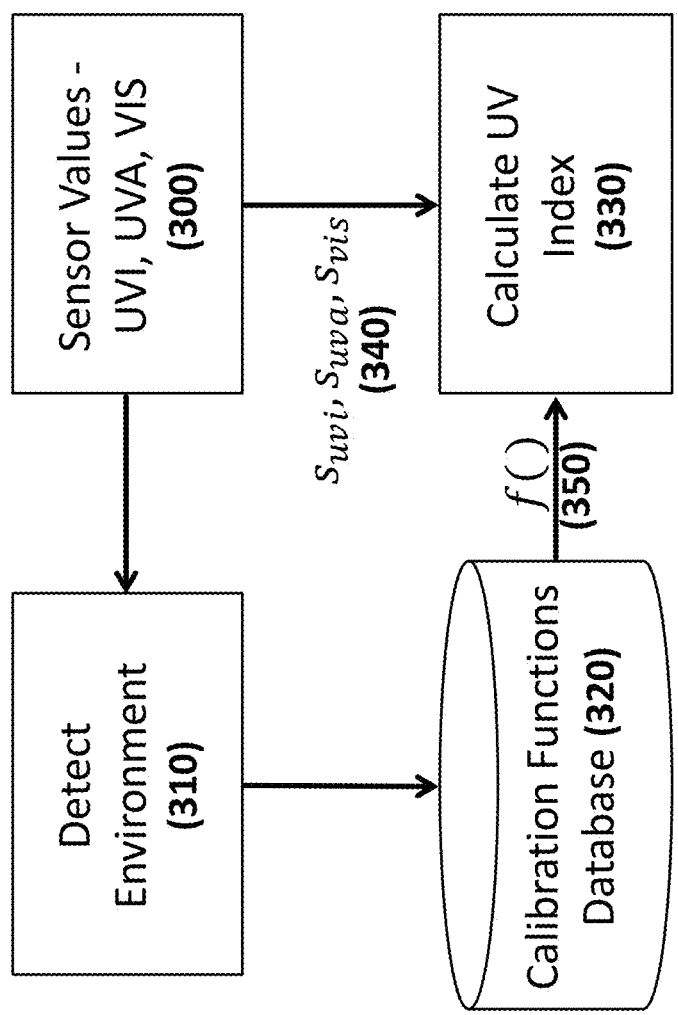

FIG. 5 is an exemplary method of selecting the appropriate model for predicting the erythemally-weighted UV exposure from the sensor values.

Figure 6:
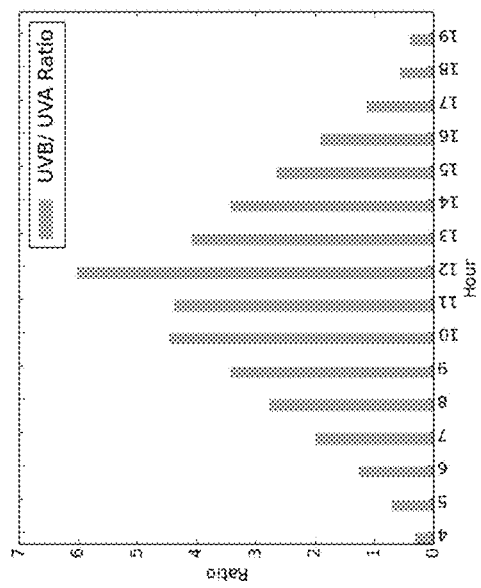

FIG. 6 shows the ratio of erythemally-weighted UVB to erythemally-weighted UVA as seen over the course of a day (every hour).

Figure 7:
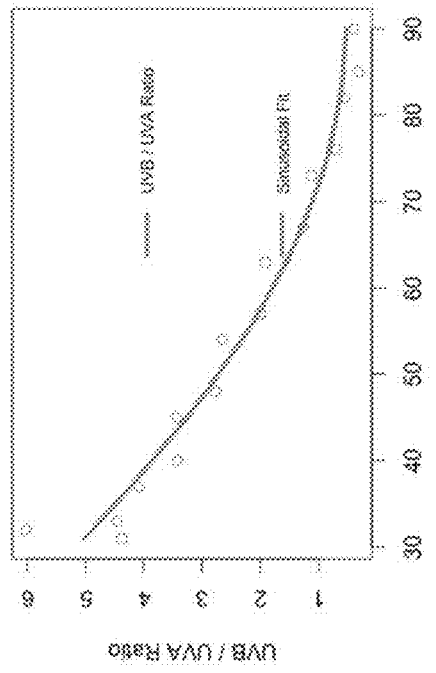

FIG. 7 shows the variation of $R_{B/A}$ with the solar zenith angle.

Figure 8:
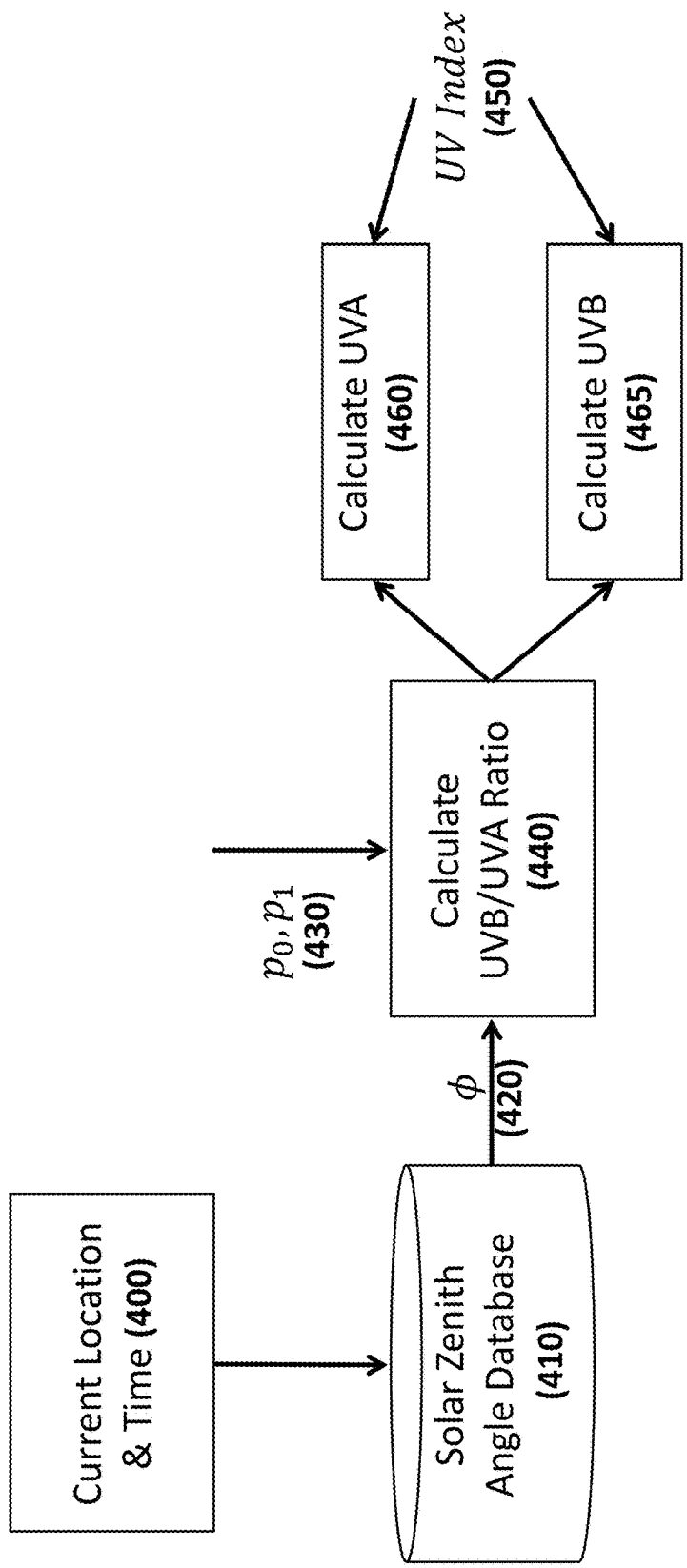

FIG. 8 shows an exemplary method for the estimation of UVA and UVB.

Figure 9B:
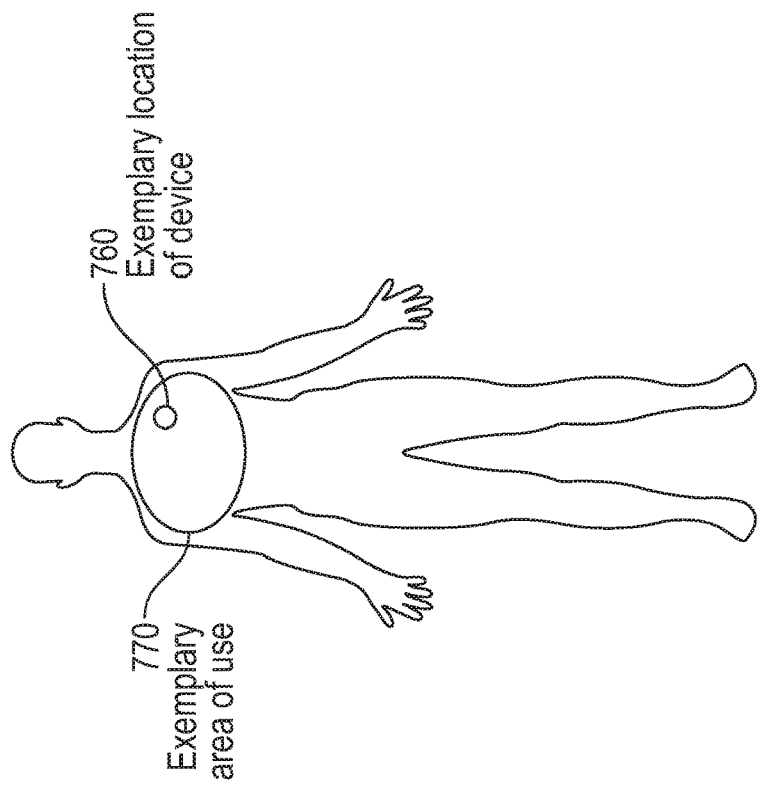
Figure 9A:
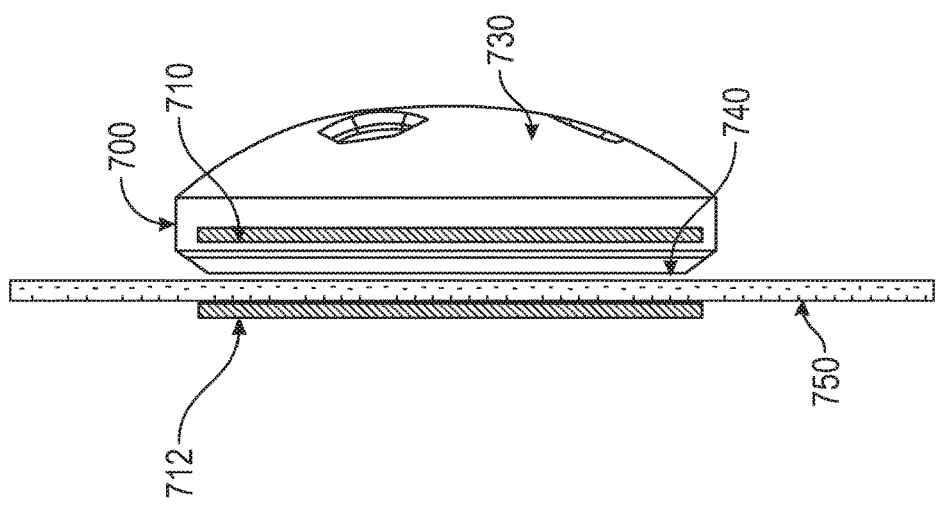

FIGS. 9(a) and 9(b) illustrate an exemplary magnetic attachment system.

Figure 10:
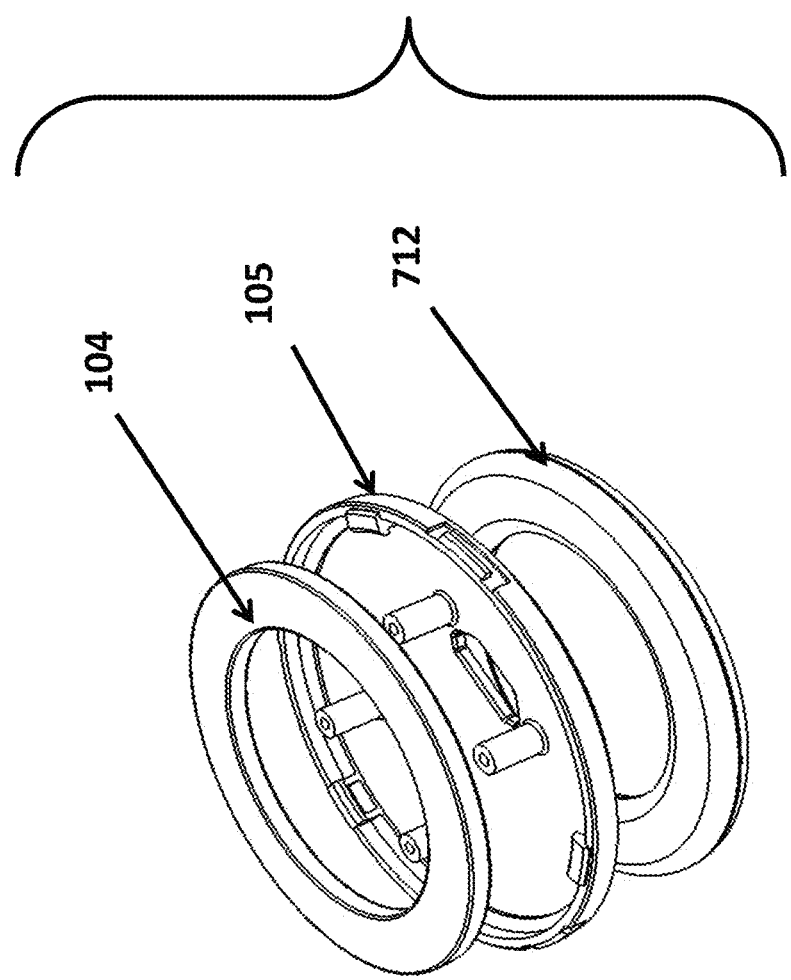

FIG. 10 illustrates an exemplary magnetic attachment system.

FIGS. 11A and 11B illustrate an exemplary charging system.

FIGS. 12A and 12B illustrate an angle the tilt ($\phi$).

Figure 13:
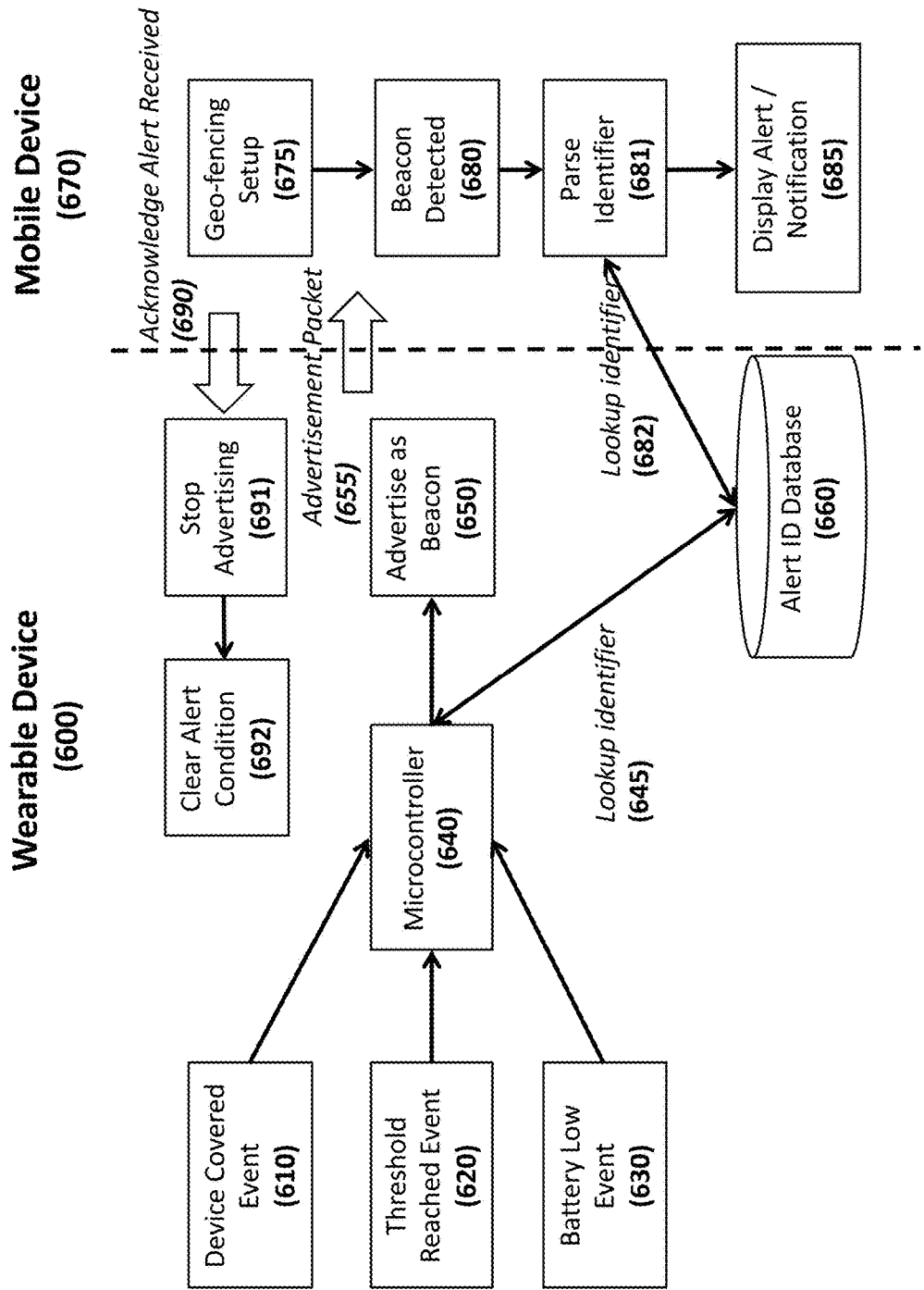

FIG. 13 illustrates an exemplary method of user notification.

FIGS. 14(a)(i) and 14(a)(ii) illustrate light with and without a diffuser.

FIG. 14(b) illustrates the angle between a normal and the incoming ray of light.

FIG. 15 illustrates an exemplary wearable device, including a diffuser therein and above a plurality of sensors also within the wearable device.

Figure 16B:
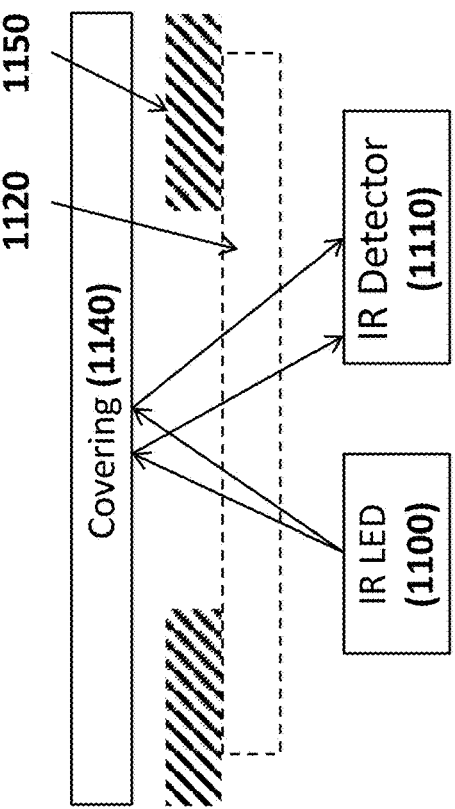
Figure 16A:
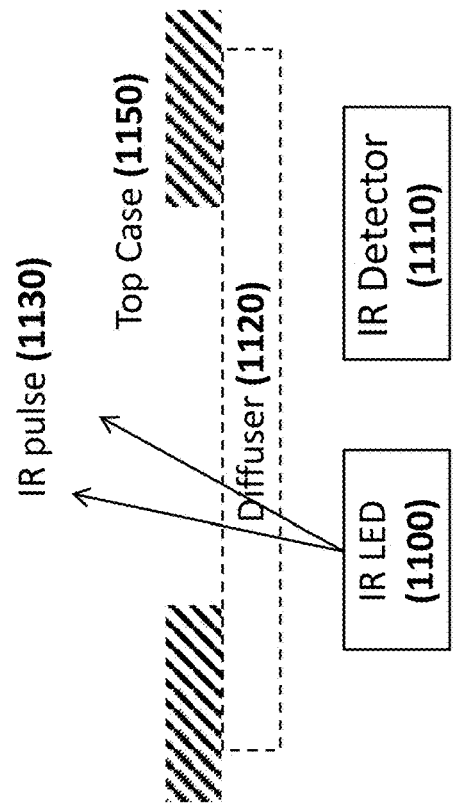

FIGS. 16A and 16B illustrate an exemplary proximity sensor, including a light source and a detector, and a covering material over the proximity sensor.

Figure 17:
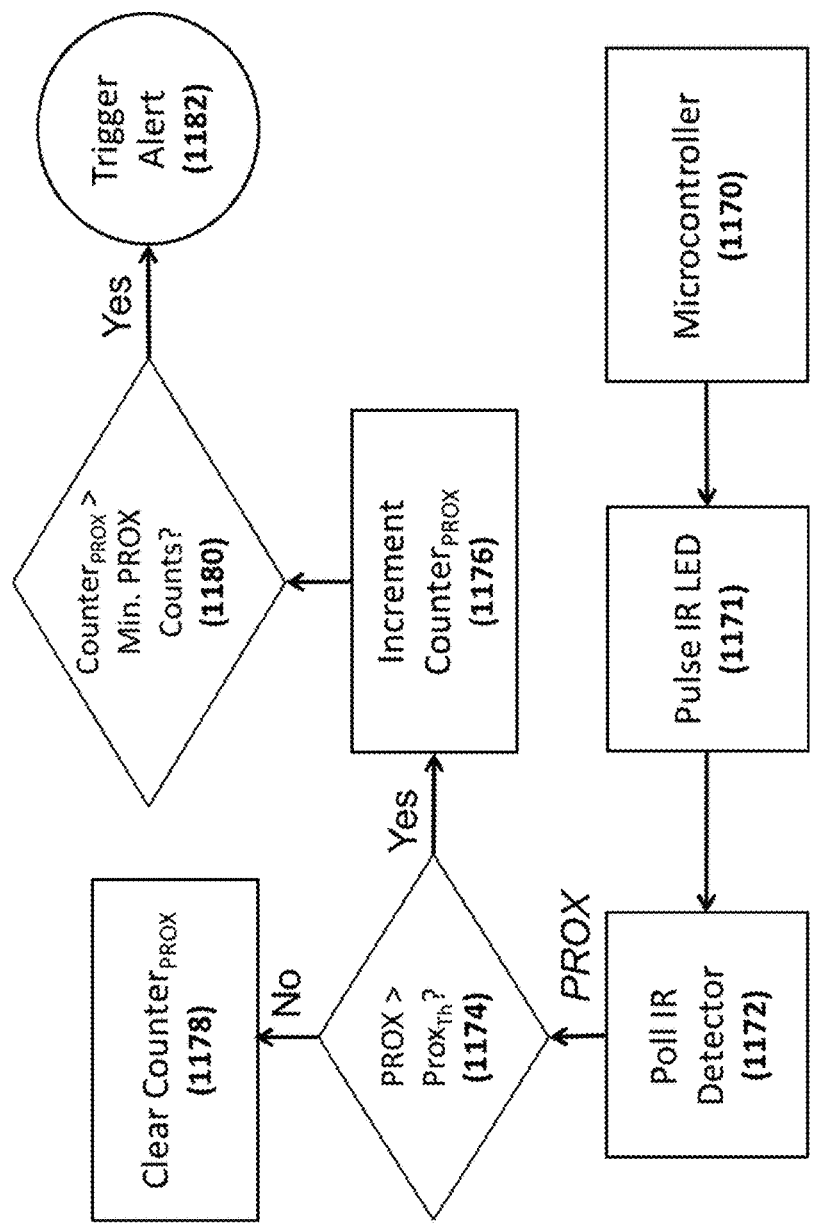

FIG. 17 illustrates an exemplary method for proximity detection using a proximity sensor.

Figure 18:
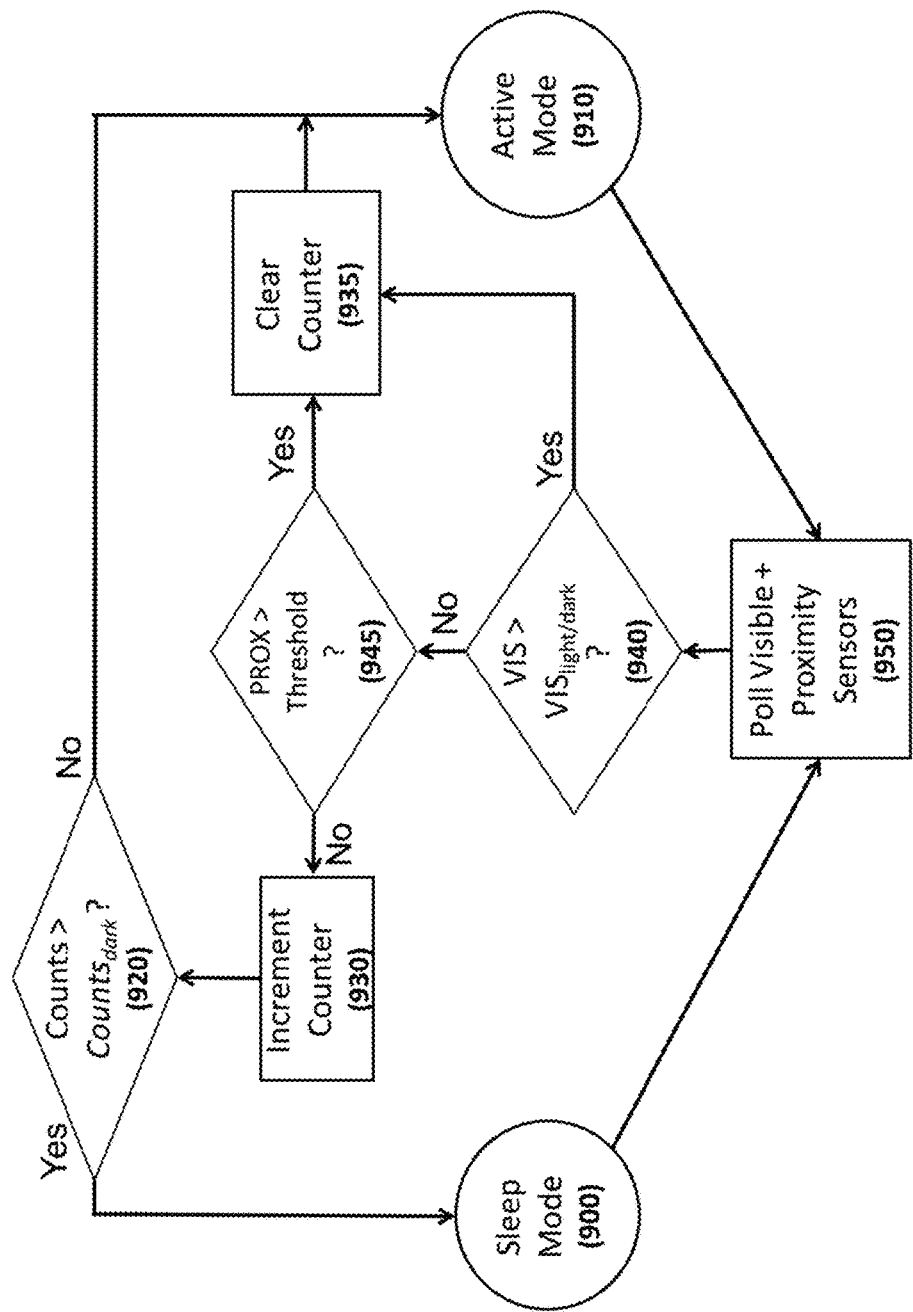

FIG. 18 illustrates an exemplary method that can cause a device to switch between a sleep mode and an active mode.

Figure 19B:
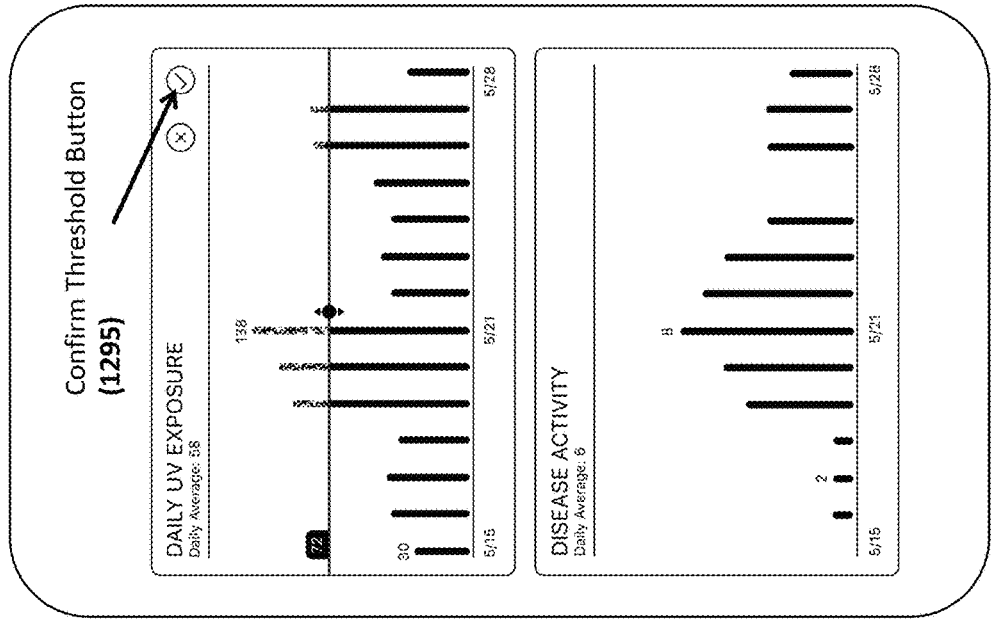
Figure 19A:
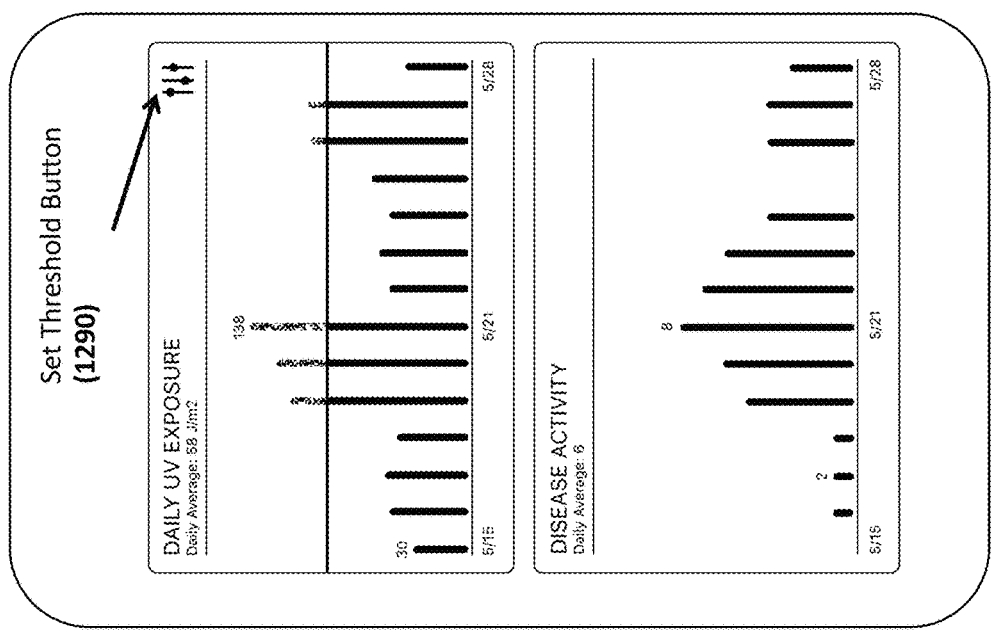

FIGS. 19A and 19B illustrate exemplary displays and a method of allowing users to select a UV threshold based on a time history of symptoms and UV exposure.

Figure 20:
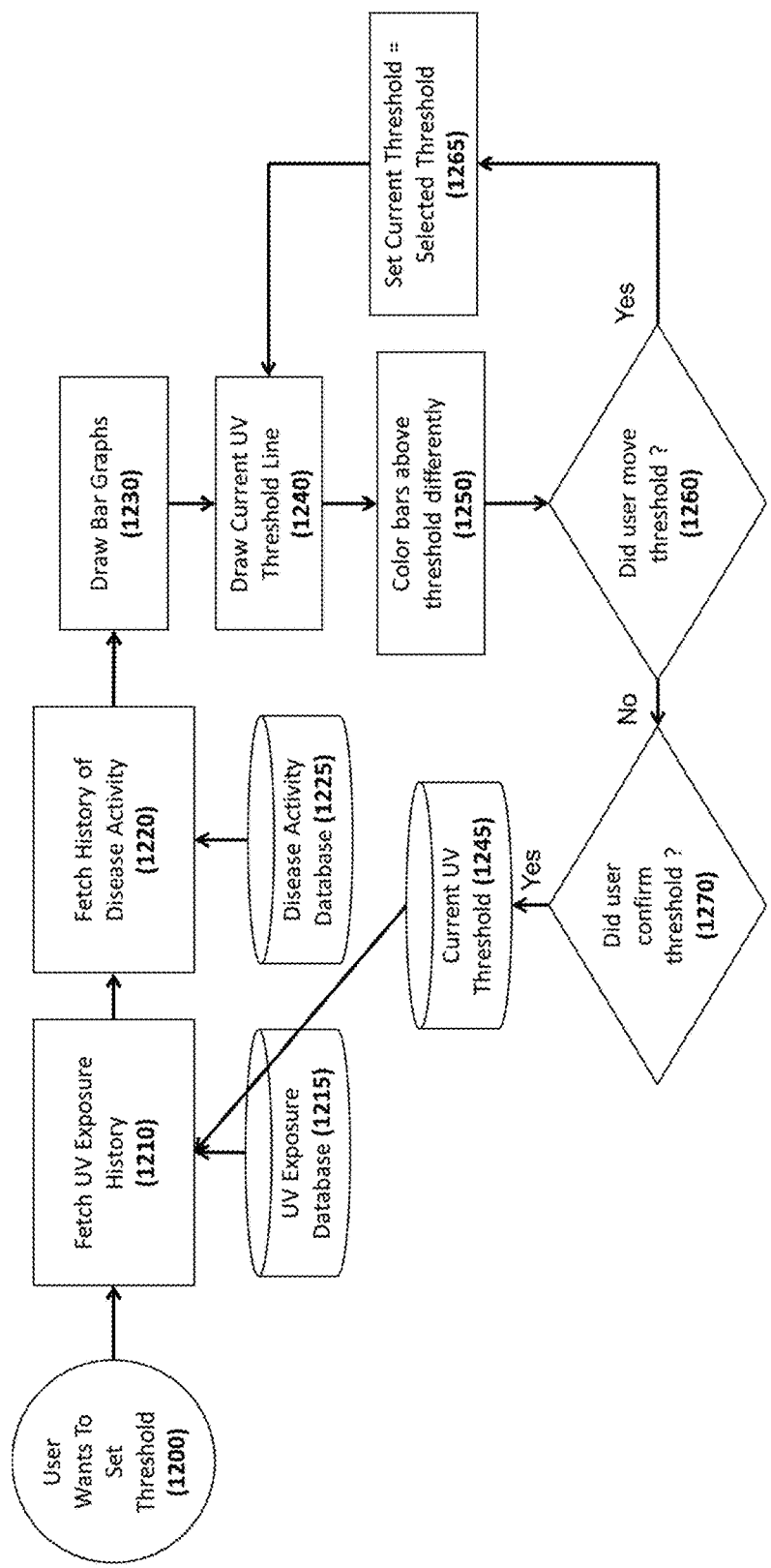

FIG. 20 illustrates an exemplary embodiment of a method for setting a threshold.

Figure 21:
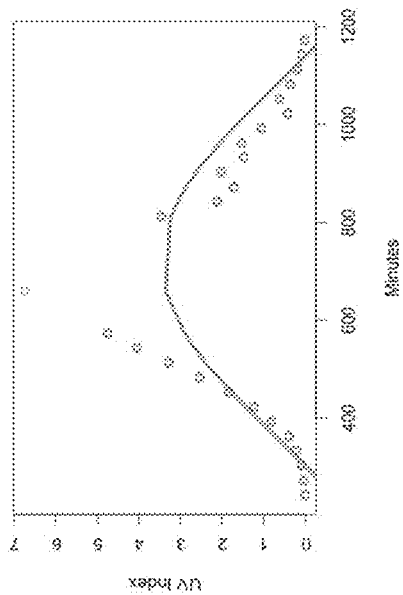

FIG. 21 shows the variation of UV index over a typical day.

Figure 22:
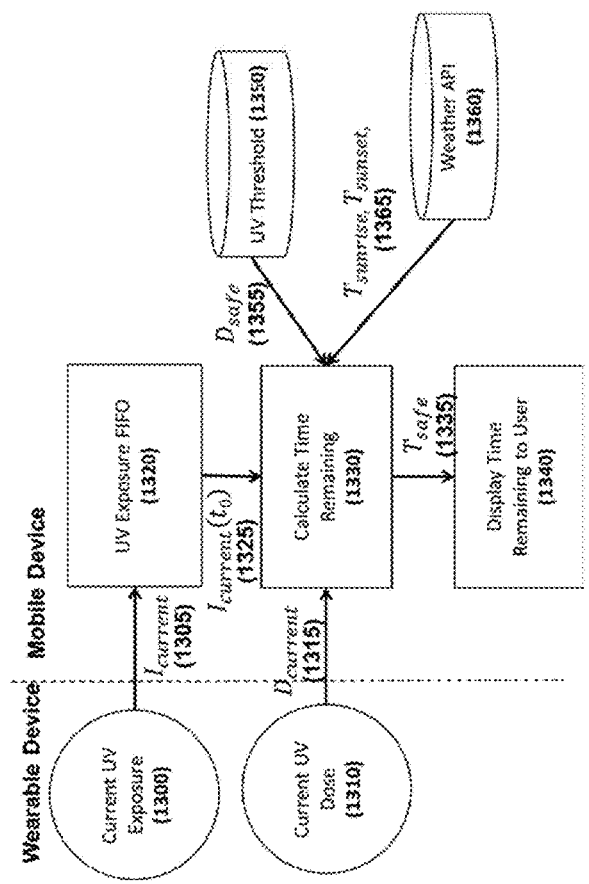

An exemplary computer executable method for estimating the safe amount of time to spend in current UV conditions is shown in FIG. 22.

Figure 23:
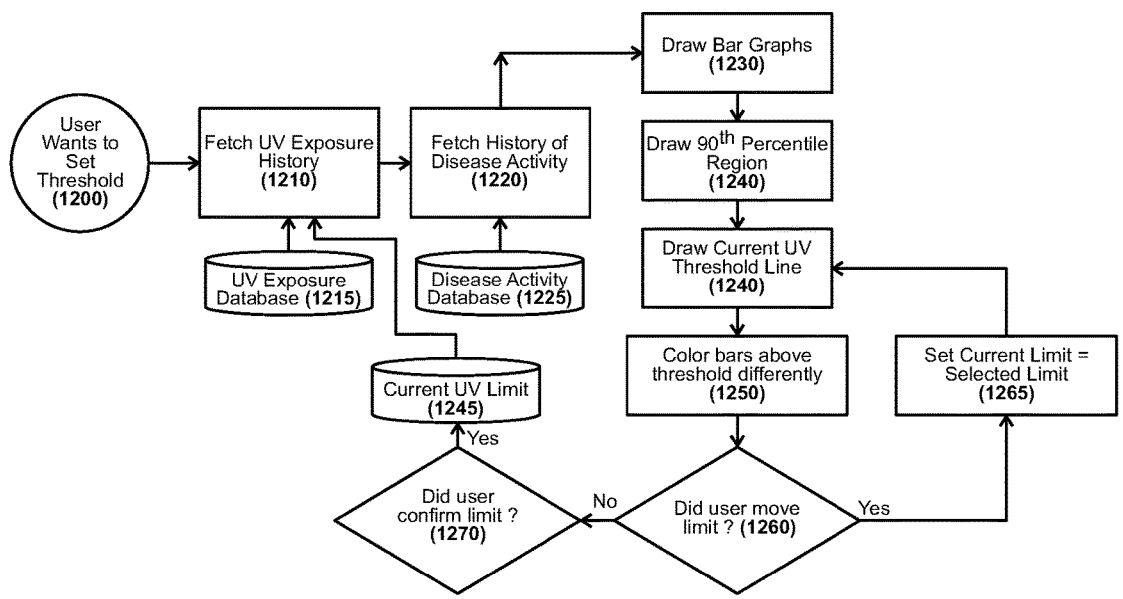

FIG. 23 illustrates an exemplary method of visually presenting a percentile of UV dose.

Figure 24:
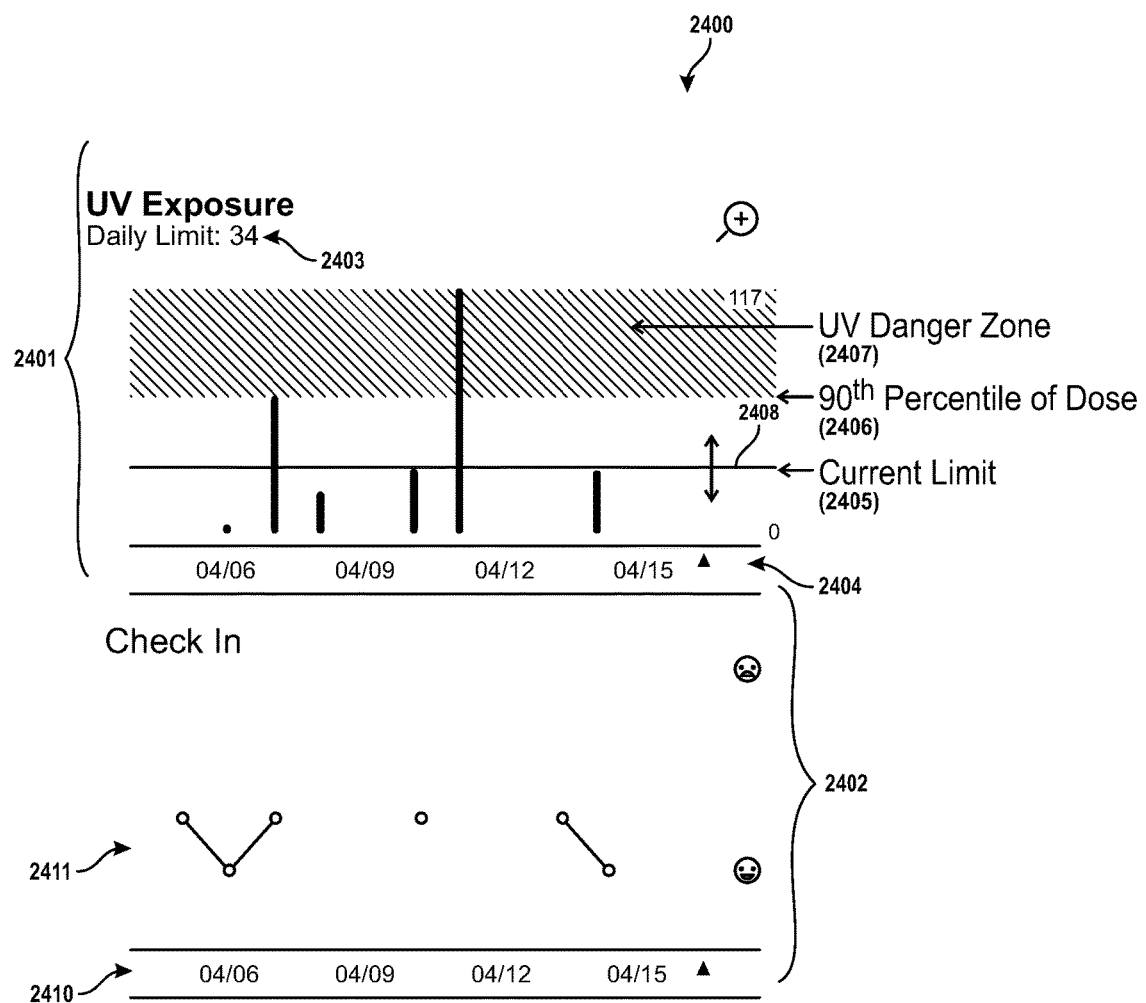

FIG. 24 illustrates an exemplary visual presentation on a display of a device.

DETAILED DESCRIPTION

FIGS. 1-22, referenced in the disclosure below, are those shown in U.S. Pat. App. Pub. 2016/0364131A1. The systems and methods described above can include or incorporate any and all aspects of any of the systems, devices, and methods described below. For example, any of the methods above can be performed using algorithms stored in memory on a hand-held device and/or a wearable UV sensing device.

The methods and devices herein, however, can be incorporated with other types of UV sensing systems, and are not limited to those shown in FIGS. 1-22. For example, the methods herein can be used to calculate a percentile of a time history of UV dose calculated using traditional or other UV sensing and dose determination devices. Additionally, the methods herein can be used to establish a new UV dose threshold for the system using the calculated percentile, without requiring a user to be part of the UV dose threshold selection process (or without allowing a user to select the UV dose limit).

Figure 1:
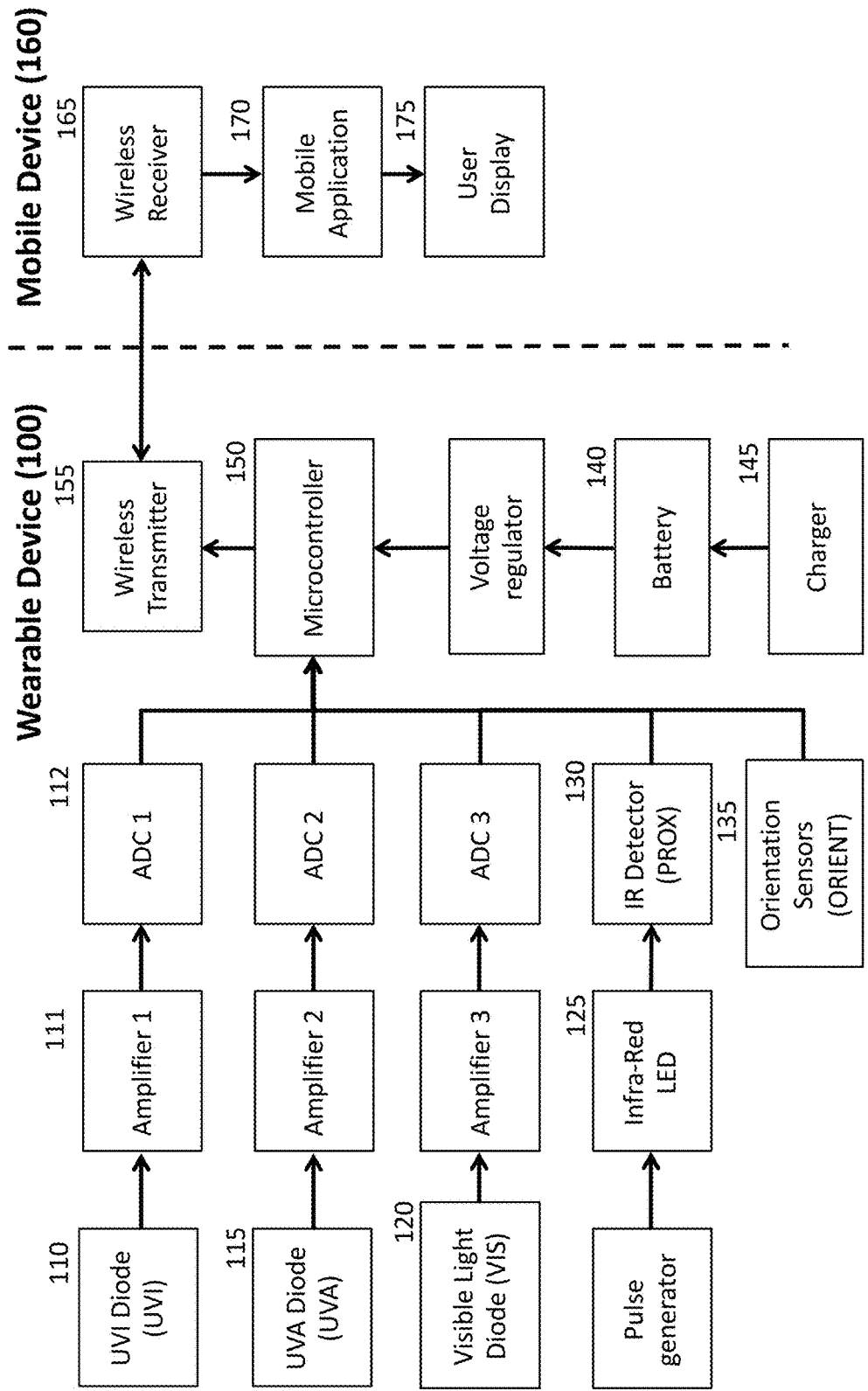
FIG. 1 illustrates an exemplary system including a wearable UV sensing device and a mobile device.

FIG. 1 is a block diagram of an exemplary system that can be adapted for accurate measurement and real-time feedback of ultraviolet exposure, and can incorporate any of the methods herein. The system in FIG. 1 includes two subsystems. The first subsystem is wearable device (100). Wearable device 100 includes a plurality of light sensors—a UV Index ("UVI") diode (110), a UVA diode (UVA) (115), a visible light diode (VIS) (120), an infra-red LED (125) coupled with an infra-red detector (PROX) (130). Additionally, the wearable device also includes one or more orientation sensors (ORIENT) (135) capable of determining the orientation of the wearable device in space. Sensors 110, 115, and 120 are in communication with a microcontroller (150) via one or more transimpedance amplifiers A1-A3, respectively (111), which itself is powered by an on-board battery (140). The battery is capable of being recharged via a charger (145). Microcontroller 150 transmits collected data via a wireless transmitter (155) following a certain protocol such as Bluetooth Low Energy, which is known.

The exemplary system in FIG. 1 includes a second subsystem—mobile device 160. The mobile device may also be referred to as a "remote" device. Mobile device (160) can be a typical handheld device such as a smartphone or tablet, which has a wireless receiver (165) that follows the same protocol as the transmitter on the wearable, e.g., Bluetooth Low Energy. Collected data is received by an application (170) executable on mobile device (160), which interfaces with the user via a display (175) that includes one or more pieces of information about the user's UV exposure. This display can be the screen of the mobile device.

Figure 2:
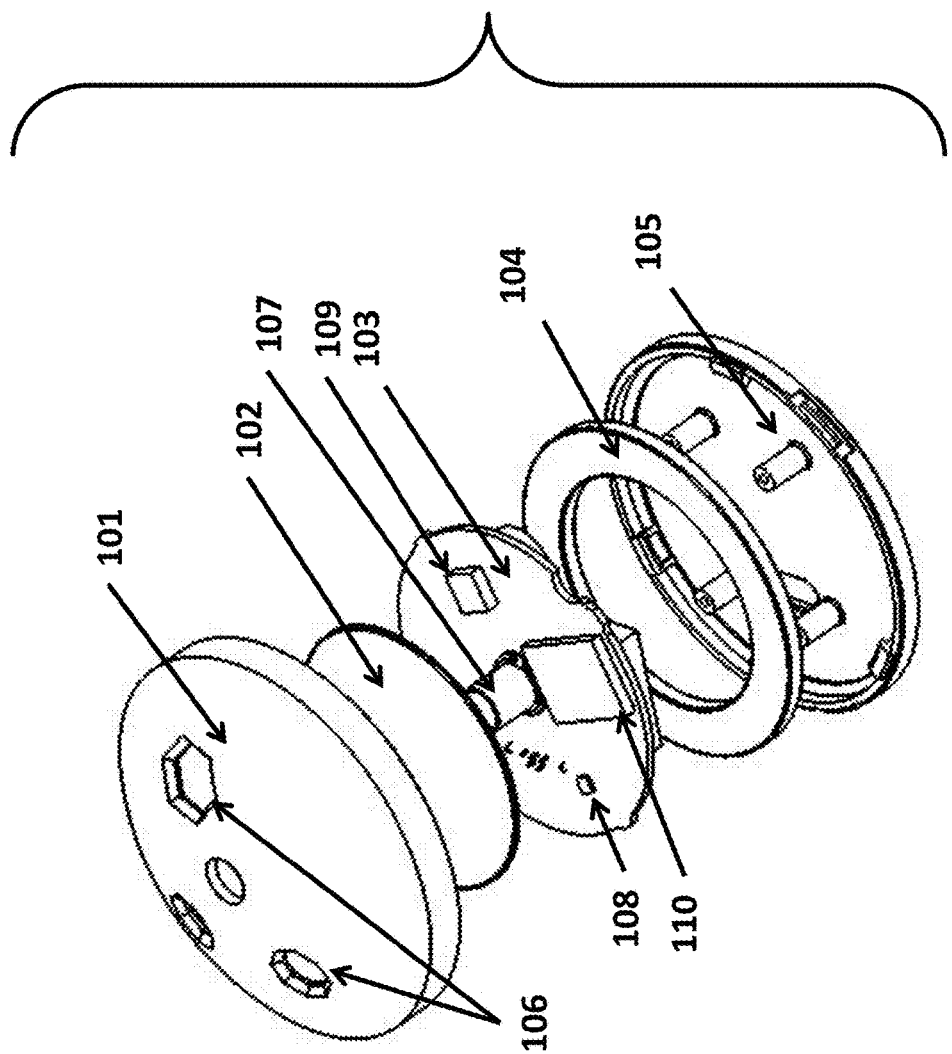
FIG. 2 is an exploded view of an exemplary wearable device.

An exploded view of an exemplary implementation of wearable device 100 is shown in FIG. 2. The wearable device includes a housing comprising top case 101 and bottom case 105, which contain therein internal components. Top case (101) is made of opaque material and has a plurality of windows 106 therein that allow light to reach the sensors that are disposed on a printed circuit board (PCB) (103) within the housing. In this exemplary embodiment, the device includes UVI sensor 107 disposed below the central window, proximity and visible light sensor 108 disposed below a peripheral window, UVA sensor 109 disposed below a second peripheral window, and a LED that cannot be seen in FIG. 2 because it is obscured by diffuser 107, but is disposed on printed circuit board 103 below a third peripheral window (the top window in the figure). In this exemplary embodiment the top case 101 includes a UVI sensor window, a UVA sensor window, a window for a sensor that includes both a proximity sensor and visible light sensor, and a LED light window, but in other embodiments it can have a different number of windows depending on how many objects disposed in the housing need to receive light, and their relative positions. Diffuser 102 is disposed between the top case 101 and the PCB 103, which is adapted to capture light from different angles and project them on to the sensors below. The PCB 103 rests on a magnet (104), which is optionally annular, which engages and attaches to the bottom case (105). The bottom case and the top case are secured to one another. The magnet can be is used in an attachment system, examples of which are described herein, wherein an external magnet allows the wearable device to be clipped on to any article of clothing. Microprocessor 110 is also shown on PCB 103.

The exemplary system has a unique combination of sensors: a UVI sensor, a UVA sensor, a visible light sensor, a proximity sensor, and an orientation sensor, as well as unique algorithms that can utilize information from one or more of the sensors. The following sub-sections describe how the sensors and algorithms can all work, some individually and some together, to improve either the accuracy of measurement or real-time feedback of ultraviolet exposure. Not all of the algorithms described herein need to be performed with each other. In fact, any of the algorithms herein can be used individually.

Figure 3:
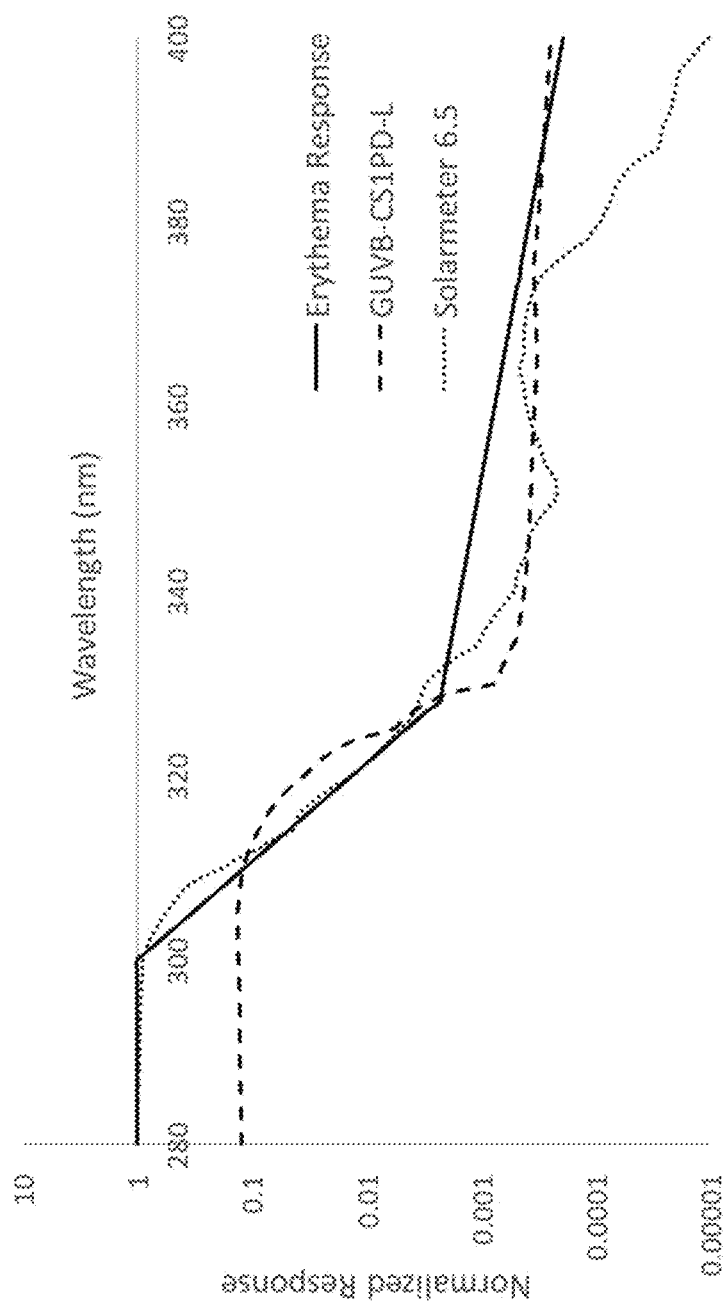
FIG. 3 shows the response of two commercially available UVI diodes and sensors in comparison to the erythema action spectrum.

The UVI, UVA and visible light sensors are all light sensors, but they have different responses to light. The optional UVA diode, examples of which are known, has a peak of measurement in the UVA region (315-400 nm) and has very low response outside this band. Similarly, the visible light diode, examples of which are known, has a peak of response in the visible light region (400-800 nm), and near-zero response outside this band. The UV Index (UVI) diode has a unique response that attempts to match the erythema action spectrum (see McKinlay, A. & Diffey, B. "A reference action spectrum for ultra-violet induced erythema in human skin". CIE J. 17-22 (1987)) by weighting the UVB (280-315 nm) exponentially higher than the UVA (315-400 nm), to mimic the impact of UV on the human body. This measurement is called erythemally-weighted UV. FIG. 3 shows the response of two commercially available UVI diodes and sensors in comparison to the erythema action spectrum.

In alternative embodiments, however, not all of the UVI, UVA, proximity, visible, and orientations sensors are included in the wearable device. For example, a UVA sensor is optional if information from a UVA is not needed for a particular method. Similarly, a visible light sensor is optional if an algorithm need not receive information from a visible light sensor. In some embodiments the device does not include an orientation sensor if the orientation is not needed or desired.

A previous experiment (E. Thieden et al., "The wrist is a reliable body site for personal dosimetry of ultraviolet radiation", *Journal of Photodermatology, photoimmunology & photomedicine*, Vol. 16, Issue 2, 2000) has observed that there is poor correlation between measurements of UV exposure on different parts of the human body (e.g., measuring on the wrist correlates poorly with measuring on the top of the head). Since a primary goal of the disclosure herein is accuracy of UV index estimation, the systems herein generally measure UV exposure on a specific part of the body only. For UV-sensitive patients, long-sleeved clothing and long pants cover most of the body from UV exposure, but the face is usually left exposed (since no one wears a mask in broad daylight). Therefore, in some embodiments, the system is adapted to accurately measure UV radiation dose incident on the face. The following subsections will list several characteristics of exemplary systems that can enable this.

1. Real-Time Correction using Environment Detection

Measurement of erythemally-weighted UV (UV Index) from the solar spectrum is very prone to error. One of the primary factors affecting the accuracy of measurement is the environment in which the device is being used. Broadly speaking, there are two usage environments—indoors (220) and outdoors (250). Indoors can be further subdivided as being in direct sunlight 230 (through windows), or away from sunlight 235. Outdoor environment can be characterized as being in the open or in the shade 290. The open can be separated into sunny 280 or cloudy 270. Since the sensors are usually calibrated for only one type of environment, they will be erroneous when used in other types of environments. It is thus important to identify the environment and correct the output of the sensors accordingly, depending on the environment.

This exemplary system identifies the following environments:

(a) Indoors (220), in direct sunlight through windows (230)

(b) Indoors (220), away from direct sunlight (235)

(c) Outdoors (250), in shade (290)

(d) Outdoors (250), in the open with sunny weather (280)

(e) Outdoors (250), in the open with cloudy weather (270)

An exemplary algorithm for determining the environment based on sensor readings is shown in FIG. 4. This is a decision tree algorithm based on the readings from the UVI, UVA and visible light sensors (200). The next section will describe how these sensors are used to separately estimate erythemally-weighted UVA and UVB, but for this section it is assumed that the values have already been derived. We know that UVB is absorbed by glass and hence drops to undetectable levels when indoors. The same is not true for UVA, which is usually transmitted through glass. Thus, at the first level of the decision tree, we utilize the UVB value in comparison to a threshold UVBth to determine if the user is indoors or outdoors (210). The value of the threshold is trained a priori by collecting data from several users in both indoor and outdoor situations. A maximal margin separating hyperplane method (e.g., Cortes, C.; Vapnik, V. (1995). "Support-vector networks". Machine Learning 20 (3):273. doi: 10.1007/BF00994018) can be used to train this threshold from the collected data.

If the user is determined to be indoors, the algorithm then utilizes the UVA sensor value to decide if the user is in direct sunlight through the windows or away from it. The algorithm then compares this UVA sensor reading to a threshold UVAth,indoor, (225) which can be set using the same set of machine learning methods described above. It is known that UVA partially travels through windows, which makes the UVA value higher when in sunlight through the windows, and lower when away from the window.

If the algorithm determines the user is outdoors, the algorithm utilizes the reading of the visible light sensor (VIS) to determine if the user is in shade or in the open. The algorithm then compares the reading from the VIS sensor to a threshold VISth,shade (255). Being lower than the threshold implies shade, while being above the threshold indicates being in the open. This threshold can be trained using data collected from a number of users in both situations. Finally, if in the open, the sensor values can further be utilized to determine whether the weather is cloudy or sunny. This is achieved using both the visible light readings (VIS) and the UVB reading (260). We know that clouds attenuate the visible light, but transmit UVB, while in sunny weather both VIS and UVB are high. We formulate this determination of cloudy vs. sunny as an optimization problem, where:

Environment= Cloudy, if $a_1 UVB + a_2 VIS + a_3 < 0$ = Sunny, if $a_1 UVB + a_2 VIS + a_3 \geq 0$ The parameters a1, a2 and a3 can be trained using data collected with the devices placed in sunny and cloudy conditions. A maximal margin separating hyperplane algorithm (also known as a support vector machine) can be used to determine the optimal value of these coefficients. The above sunny vs. cloudy determination has been described as a two-class problem, but it can also be described as a multi-class problem to detect different cloud densities e.g., scattered light clouds vs. overcast. Solving such a multi-class problem would involve training several one-vs-all classifiers—one for each class that we are interested in.

Once the environment is detected, the device is able to select the appropriate model for predicting the erythemally-weighted UV exposure from the sensor values—FIG. 5. We refer to it as the UV Index, although strictly speaking the UV Index is for horizontal measurements and the device presented here has an orientation similar to the user's face. The UV Index is modeled as a polynomial function of the UVI, UVA and VIS sensor values ($s_{uvi}$, $s_{uva}$, $s_{vis}$):

UV Index=$f(s_{uvi}, s_{uva}, s_{vis})$

The form of the polynomial function is derived during the calibration process. If we fit only one calibration function or model (f) for all environmental conditions, it suffers from a lack of accuracy. For example, a model that is calibrated on data collected across a variety of environments will not be particularly accurate for just the indoor environment. However, using multiple models, each of which is calibrated to data from a particular environment allows each model to be more accurate for only its particular environment. This exemplary embodiment uses five such models, corresponding to our five environments described above, which is stored in a calibration database (320). When the environment is detected (310) using our aforementioned decision tree algorithm, the system is able to select the most appropriate calibration function (350), which is then used with the sensor values (300) to derive the UV Index (330). This gives the most accurate measurement of the UV Index in all possible environments. The UV Index can then be, for example, displayed to a user on a display.

2. Separation of UV Measurement into UVA and UVB

The importance of separating UV dose measurement into UVA (320-400 nm wavelength) and UVB (280-320 nm wavelength) has already been elucidated. UVA has very different impact on the human body as compared to UVB. Different amounts of UVA and UVB are required for activation of an adverse response, with the amount of UVB being much smaller than UVA for the same adverse response. To weigh the consequences of UVB and UVA on an equal footing, it suffices to compare erythemally-weighted UVB and UVA. Here we describe two exemplary methods to measure erythemally weighted UVA and UVB dose—one utilizing two UVI diodes with different filters, the other utilizing software-based estimation with a single UVI diode.

In the first method, two diodes with identical response similar to the erythema spectrum are placed in the wearable device, one underneath a filter that lets pass the UVA region of the spectrum and nothing else, the other one underneath a similar filter for UVB. Since perfect filters for the said regions of the spectrum do not exist in practice, this method introduces errors, the first consequence of which is that the addition of the responses of both diodes (even when normalized to the peak transmission of each individual filter) may not be equal to the full erythema spectrum, hence the UVI cannot be retrieved from this device, even if the response curve of the original diodes were to match perfectly the erythema curve.

Another embodiment of the above concept makes use of diodes with different responses each, and also different filters. The combination of each diode response and filter tries to match as closely as possible the UVA portion of the erythema spectrum in one case, and the UVB in the other.

In either case, this configuration utilizing two diodes resembles that of the UVA and UVI diodes in FIG. 1, in that each is connected to an analog amplifier, then analog to digital converter and then the response is read in the microcontroller.

The above method has the drawback of utilizing two diodes, which makes it take up more area and increases expenses. We propose an alternative scheme for separating UVA and UVB dose estimation using a single UVI diode, coupled with a mobile device which has knowledge of the current location and local time. FIG. 6 shows the ratio of erythemally-weighted UVB to erythemally-weighted UVA as seen over the course of a day (every hour). Erythemal weighting gives exponentially higher weight to UVB as opposed to UVA, but the solar spectrum also contains much higher quantities of UVA as compared to UVB. The plot shown is for a location in France in summer. This ratio varies with location (latitude in particular), as well as time of the year. There are lower amounts of UVB during winter, and higher amounts during summer.

The erythemally weighted UVB/UVA ratio (RB/A) is modeled as a function of solar zenith angle ($\phi$). FIG. 7 shows the variation of RB/A with the solar zenith angle. We fit a sinusoidal function to this data, which allows us to model the UVB/UVA ratio as a function of the solar zenith angle.

$$R_{B/A} = p_0 + p_1 \sin \phi \qquad \text{(Eq. 2.1)}$$

The flow for estimation of UVA and UVB using this method is shown in FIG. 8. The mobile device, such as mobile device 160, has information about the current location and time of the measurement (400). This is used to look up the solar zenith angle for an existing database (410). The solar zenith angle (SZA) is readily available via internet APIs or can be computed using well-known models. With knowledge of the SZA ($\phi$) (420), and the coefficients p0, p1 (430), we calculate the UVB/UVA ratio using Eq. 2.1 (440). The system then estimates in real time, the amount of erythemally-weighted UVB (EUVB) and erythemally-weighted UVA (EUVA) separately (460, 465) from the UV Index (450) using the following equations:

$$EUVB = 25 \frac{mW}{cm^2} UVIndex \frac{R_{B/A}}{1 + R_{B/A}} \qquad \text{(Eq. 2.2)}$$

$$EUVA = 25 \frac{mW}{cm^2} UVIndex \frac{1}{1 + R_{B/A}} \qquad \text{(Eq. 2.3)}$$

The factor of 25 accounts for the fact that one unit of UV Index corresponds to 25 mW/cm2 of erythemally weighted ultraviolet radiance (McKinlay, A. & Diffey, B. "A reference action spectrum for ultra-violet induced erythema in human skin". CIE J. 17-22 (1987)). The UVA and UVB estimate can then be used in any methods herein, such as estimating the UV index.

3. Magnetic Attachment Method

Ultraviolet exposure on one region of the body often does not correlate with other regions. For example, E. Thieden et al., "The wrist is a reliable body site for personal dosimetry of ultraviolet radiation", *Journal of Photodermatology, photoimmunology & photomedicine*, Vol. 16, Issue 2, 2000, found that exposure on the chest does not correlate well with the top of the head, so measuring one does not give a clear idea of the other. The systems herein are generally configured and adapted to measure ultraviolet dose on the face. We observe that other portions of the body can be adequately shielded with clothing options such as long-sleeved shirts, trousers and shoes, but the hands and the face are the most difficult to shield due to lack of sufficient clothing options (we don't expect people to wear masks or gloves on a summer day outdoors). While the hands are continually in motion and will receive variable amounts of UV dose, the face is relatively stable. This is why measuring UV exposure on the face has advantages. For this purpose, in some embodiments the system includes a magnetic wearable system that is capable of being attached to the front of the top layer of clothing, usually a shirt. This sensor is generally always oriented in the same direction of the face, and hence will collect a UV exposure dose that correlates very closely with that of the face. Measuring on the chest also provides the advantage of having a very stable measurement, as opposed to the wrist.

The magnetic attachment system shown in FIGS. 9(*a*) and 9(*b*) comprises two magnets, one (710) disposed inside the wearable device housing and one (712) on the outside of the wearable device housing (700). The magnet in the inside of the wearable device (710) housing sits close to the bottom of the unit (740), and the wearable device is meant to be placed on top of the outer layer of clothing (750) in the upper torso region of the user (see FIG. 9(*b*). The other magnet is meant to be placed on the opposite side of the outer layer of clothes. In this manner, the attraction of the 2 magnets makes the device press against the fabric of the garment, providing a secure grasp.

Whereas the user can freely choose any place in the fabric of the garment to place the device, its intended area of use is in the upper torso (770), as depicted in FIG. 9(*b*). This method is superior to others based on specific features in clothing, such as clips, which can only be placed on edges of clothing. It is also superior to pin or brooch attachments in that it does not pierce the clothing. It is conceivable however, that in some embodiments there the wearable device can be positioned elsewhere.

This system includes similarly shaped (e.g., cylinders of same diameter, rings of same internal and external diameters, but not necessarily height) magnets (see FIG. 10), as projected to the plane that lies in between them in order to ensure that they are aligned when snapped together. The ring-shaped magnets allow for the design of a particular charging system, as described below.

4. Charging System

An exemplary charging system shown in the side and perspective views of FIGS. 11A and 11B uses conductive, concentric ring shaped conductors (810) in the bottom of the device (800), which are connected to different signals in the internal circuitry of the device. The charger makes use of spring loaded contacts (820) in a flat configuration, at varying distances from a common axis of symmetry normal to the said plane, which coincide with the radii of the conductive rings on the device, and carry the electrical signal intended to make connection with that specific ring. This is depicted in FIGS. 11A and 11B. In this way, electrical connection is ensured, irrespective of the relative rotation angle between the device and the charger around the common axis of symmetry.

The charger may optionally also include a magnet or ferromagnetic material. This will cause magnetic attraction to the magnet inside the device housing and allow for better engagement of the charger and device. The strength and position of such a magnet is also adjusted so that the magnetic clamping causes the electrical contacts on both device and charger to align correctly with each other.

5. Sensor Value Correction using Orientation Detection

As described above, the wearable device (100) can be attached to the front of the clothing using a magnetic attachment system. The purpose of the wearable device is to measure the exposure on the face ($I_{face}$) (510), and hence needs to be aligned as flat against the chest as possible. However, depending on the material of clothing used and where the device is placed, the device may, in practice, be tilted from this ideal flat position corresponding to the face orientation (520). Further, the tilt of this device might be changing very rapidly, such as when the wearable is attached to a loose shirt while the user is running. This would cause an unstable measurement, despite the user's face receiving a uniform amount of UV exposure. Stability and accuracy are both important, in order to accurately estimate UV dose. We use sensors to detect the device orientation (530) in real-time. This knowledge is then used to correct the measured exposure ($I_{device}$) (500) to correlate to that on the face. This serves the dual purpose of correcting errors and stabilizing the measurement of UV.

Orientation detection is performed by a set of orientation sensors (e.g., orientation sensor 135, in FIG. 1) including accelerometers and gyroscopes, which are known. These determine the angular position of an object in three dimensions in terms of pitch, roll and yaw. We are primarily interested in the angular rotation of the device around the horizontal axis passing from left to right through the human face. We will call this angle the tilt ($\phi$) (FIGS. 12A and 12B) (540). The tilt angle is an output from the orientation sensor, or derived from output from the orientation sensor, and is input to computer executable methods herein.

The actual irradiance incident normally on the face ($I_{face}$) can be then estimated by the system in terms of the tilt and the irradiance incident on the device ($I_{device}$) as:

$$I_{face} = I_{device} \cos \phi$$

6. Real-Time Notification from Wearable Device to Mobile Device using Geo-Fencing The wearable device (100) can be adapted to able to alert the user in certain scenarios e.g. when the daily UV exposure has exceeded safe limits, or the wearable device is running out of battery, or the wearable device is being obstructed by something. We will broadly refer to such a situation as an alert condition. The notification needs to happen soon after the alert condition is detected on the wearable device, so as to not risk the user's health, and hence needs to be in real-time. We cannot assume that the wearable device is always connected to the user's mobile device wirelessly. This is due to a number of practical reasons e.g., the user might have dismissed the mobile application on their mobile device, or the OS of the mobile device might have severed the wireless connection in order to conserve battery. Further, in most wireless protocols, the slave cannot initiate contact with the master. In this case, the slave is the wearable device, the master is the mobile device, and this is a common condition for Bluetooth/Bluetooth Low Energy. Under such circumstances, we propose a novel and unique method to notify the user of the alert condition, based on geo-fencing.

Geo-fencing is the science of alerting a mobile user when the device has entered a particular location. Normally, this location is determined using the GPS chip on the mobile device, although increasingly commonly WiFi signals are also being used to improve this location estimate. Beacon-based geo-fencing allows even more fine-grained location estimates by being able to determine if the mobile device is in the vicinity of a Bluetooth beacon whose location is known a priori. Previously, this has purely been used for more accurate location estimates, but our proposed system utilizes the same method for sending alerts from any Bluetooth-enabled device.

FIG. 13 shows an exemplary flow for user notification. The application on the mobile device (670) can be set up for beacon-based geo-fencing (675). This allows the device to be alerted whenever it is in the vicinity of a beacon with a specific identifier. This alert identifier is known to both the wearable device and the mobile device and stored in a database (660), which may exist in-memory on the wearable device and mobile device, or reside in the cloud. Three alert conditions may exist on the device: (a) the wearable device is covered by an object e.g. the user's jacket (610) (b) the measured UV dose exceeds the user's selected threshold (620), or (c) the wearable device is running low on battery (630). When the microcontroller on the wearable device (640) detects its alert condition, it switches to advertising with that same pre-specified alert identifier (650), which it looks up from the database (645). The identification information is contained in the advertisement packet of the beacon (655). The system utilizes different identifiers to indicate different alert conditions. When the mobile device is alerted of the presence of a beacon (680), it first derives the alert identifier from the beacon advertisement packet (681). It then checks its identifier against its list of known identifiers (682). If the identifier corresponds to a known alert condition, the mobile device displays this alert condition to the user (685). If the user acknowledges the alert condition, the mobile device then connects wirelessly (note that the mobile device as the master can initiate connection) and sends an acknowledgement to the wearable device (690). This acknowledgement causes the wearable to stop advertising as a beacon (691) and resume normal operation by clearing the alert condition (692).

7. Use of Diffuser with Cosine Response

In some embodiments the wearable device is adapted and configured such that the sensors lie under an opaque casing. In order for light to reach these sensors, the casing can include windows in the material to transmit light. However, depending on the angle of the incident light and the depth under the casing where the sensor lies, it is easily possible for incident light to not reach the sensor, thus giving inaccurate readings (FIG. 14(*a*)(*i*)). For this purpose, the casing should have a material that is capable of accepting light at different incident angles and removing this angular information when transmitting it to the sensor below (FIG. 14(*a*)(*ii*)). In some embodiments the wearable device thus includes one or more optical diffusers as the filling material for the aforementioned windows. Here we describe the desired response of the diffuser material.

The amount of irradiance in a flat area element A from a planar source of light (direct light from the sun can be assumed to be a planar source, since the origin of the rays is so far away that they are almost parallel) reaches a maximum when the normal of the element is parallel to the incoming rays. Let's call this maximum $I_{max}$. If the area is then tilted so that the angle between its normal and the incoming rays is θ (as seen in FIG. 14(*b*)), then the irradiance varies as a cosine of θ multiplied by the maximum radiation. Note that this is independent of rotation of the said area element around its normal.

Irradiance of a tilted plane can be expressed then as a function of θ such that:

$$I(\theta) = I_{max} \cos(\theta) \tag{Eq. 7.1}$$

In order to be true to the physical quantity being measured, the wearable device should exhibit the same angular response when the sensor is tilted with respect to the sun. The optical diffuser, placed on top of the UV and optical sensors, needs to have the properties of a perfect Lambertian diffuser, which will allow the recovery of the desired cosine angular response (Eq. 7.1). The device includes windows of a specific material aimed at resembling as close as possible a Lambertian transmission diffuser. The diffuser material may be cut into window-shaped pieces and adhered underneath the openings to allow the light in, or may be assembled as a single piece directly underneath the windows using clips in the casing, as depicted in FIG. 15. In this depiction, the top case (1050) comprises clips (1030) into which the single-piece diffuser (1040) is able to snap in place, and be held firmly. The plurality of windows in the top case are directly positioned above the sensors of interest (1010, 1020), which reside on the printed circuit board (PCB) (1000).

8. Covering Detection and Alert

As previously described, in some embodiments the wearable device is magnetically attached to the front of the clothing. It is possible that the user mistakenly covers this device, such as when wearing a jacket over the shirt. This would cause the covering to block all UV to the device, and thus render it unable to estimate the radiation incident on the face. In order to overcome this problem, in some embodiments the wearable device includes a covering detection system, which is capable of alerting the user, so that the covering may be promptly removed.

In this embodiment, in order to detect covering, a proximity sensor (e.g., proximity sensor 130 in FIG. 1) is used, which includes an infra-red (IR) LED (1100) and an IR detector (1110). The IR LED sends pulses outward (1130). The two components are place under a window of the top case (1150), which is covered by diffuser material (1120). Without any covering items, the IR pulses escape and are not captured by the IR detector (see FIG. 16A). If any object is covering the wearable (1140), there is significantly high reflection of IR from it and is picked up as a signal in the IR detector, as shown in FIG. 16B.

The flow for proximity detection is shown in FIG. 17. The micro-controller (1170) pulses the IR LED (1171) and polls the value of the IR detector (1172) in sequence. If the IR detector signal (PROX) is found to exceed a certain proximity threshold ($PROX_{th}$) (1174), then the microcontroller increments a counter (1176), else clears the counter (1178). When the counter ($Counter_{PROX}$) exceeds a pre-specified threshold (1180), the microcontroller determines that there is material covering the wearable device. It then triggers an alert condition (1182), which in turn will notify the user that their device is covered by something.

9. Night Detection for Sleep Mode

The wearable device needs to not only be accurate, but also power-efficient so that it is able to maximize the amount of UV data captured on a single charge. For this purpose, collecting UV data in the absence of the sun i.e. before dawn or after dusk, is an unnecessary drain on the power supply. Being able to sleep during this time saves both battery and memory for collecting data. However, it is not expected that the wearable device will be constantly connected to the mobile device, which would make it unaware of sunrise and sunset times. In order to overcome this issue, we utilize an algorithm based on the existing sensors, which determines when to sleep and when to wake up the device.

FIG. 18 shows an exemplary sleep mode algorithm in more detail. In the designed system, there are two modes—sleep mode (900) and active mode (910). In active mode all sensors are active and the microcontroller polls these sensors to aggregate the UV data. From polling the visible light sensor (950) it determines if the reading (VIS) is above a certain threshold. It also polls the proximity sensor (PROX) to ensure that there is nothing covering the device. If the reading is found to be below a pre-determined light/dark threshold ($VIS_{light/dark}$) (940), and the proximity reading exceeds the covered threshold (945), a counter is incremented (930), else the counter is cleared (935). If the counter exceeds a pre-specified value ($Counts_{dark}$) (920), indicating the condition of darkness has persisted for some time, the device is put into sleep mode (900). Running a counter-based scheme helps prevent against noisy readings, or sudden darkness conditions e.g., when a train passes through a tunnel. If the proximity sensor senses something is covering the device rather than darkness due to the absence of sun, the system can send an alert to the user, as described above.

In sleep mode all sensors apart from the visible light sensor are shut down. The visible light sensor is also polled (950) at a much reduced interval by the micro-controller in order to conserve more energy. If the visible light reading is found to cross the same light/dark threshold ($VIS_{light/dark}$) (940), then the microcontroller puts the device back into active mode.

10. User-Selectable Safe Thresholds Based on UV Exposure History

In order to avoid harmful effects of UV over-exposure (exposure over a prolonged period of time) such as sunburn or phototoxicity, it is important to understand and determine safe thresholds for UV dose (Sayre, R. & Desrochers, D. "Skin type, minimal erythema dose (MED), and sunlight acclimatization". *Am. Acad. dermatology* 439-443 (1981); Heckman, C. J. et al. "Minimal Erythema Dose (MED) testing". *J. Vis. Exp.* e50175 (2013). doi:10.3791/50175). We have already described a system for alerting the user when such safe thresholds are exceeded. Here we describe a method for selecting such a threshold based on past exposure history, along with disease activity. We define the term disease activity to indicate symptom occurrences and general well-being of the user, as tracked on a periodic basis via the mobile application. Symptoms include skin reactions (e.g., erythema, sunburn, etc.) and systemic symptoms (e.g. joint pain, etc.). Our system asks the user to rate their disease activity daily on a scale of 0 (no symptoms, good health), to 10 (lots of symptoms, poor health). Note that the threshold may apply to a full day's UV dose, or to some other time unit, such as a week, or an hour. The unit of time may also be user-selectable, e.g., a user may choose to select a threshold for hourly UV dose, and a different threshold for daily UV dose. We will describe the rest of this section using daily threshold as an example, but it easily extends to other time periods. Also, we will describe the example using UV dose, but it is equally applicable to UVA dose or UVB dose individually. By looking at both disease activity and UV dose, the user decides to manage a dose of UV exposure that he or she thinks may be safe for his or her own wellbeing. Different users have different tolerances to UV and our method enables anybody to manage the right amount of UV dose.

The threshold selection occurs on the mobile device, where all or some of the following information can be presented to the user:
  (i) Minimum daily UV dose (over period of usage of the device)
  (ii) Maximum daily UV dose (over period of usage of the device)
  (iii) Average daily UV dose
  (iv) Symptoms by date
  (v) UV dose history by date FIGS. 19A and 19B show one depiction of this information. The top graphs labeled "UV daily exposure" represents UV dose in units of Joulcs/m$^2$ (B. L. Diffey et al., "The standard erythema dose: a new photobiological concept", *Journal of Photodermatology, photoimmunology & photomedicine*, Vol. 13, 1997). This is visually presented on top of another graph with a representation of disease activity information, and can either be on the same graph, or on an adjacent (the information can be presented in many different ways). The disease activity is, in this embodiment, shown as a score, which was recorded by the user on a daily basis. The daily minimum, maximum and average dose can also be shown on the plot. The maximum of the UV dose on the Y-axis is set according to the maximum daily UV dose ever received by the user. By understanding the time history of the symptoms, the user is then able to select a daily threshold using a slider (or some other form of input), which lies between zero and the maximum UV dose the user has ever been exposed to. The threshold can be selected so that future symptoms can be avoided or minimized. For example, if a relatively high UV dose is associated with certain diseases symptoms, as indicated on the screen, a user can select a threshold dose that is below the level of the dose that was associated with the disease symptoms. Such thresholds can also be determined for UVA and UVB separately. Such a threshold can be determined for hourly, daily, weekly, monthly doses. Threshold can be chosen over any number of hours, days, weeks, months, and in some embodiments the user can select the time epoch for which to set this threshold. In some embodiments the time histories are broken up into epochs of time, and can be the same epochs, or they can be broken up into different epochs of time.

One embodiment of the user interaction flow for setting the threshold is shown in FIG. 20. The process is started with the user requesting to set their UV threshold (1200). This action may be in the form of tapping a button on the mobile application (1290) (e.g., FIG. 19A), or may use other forms of input such as voice. When the mobile application receives this request, it fetches the user's UV exposure history (1210) from the UV exposure history database (1215), and the user's current UV threshold from its respective database (1245). The database may reside on the mobile device running the application, or in the cloud, in which case the data would be retrieved over the internet. Concurrently, the user's disease activity information is also retrieved (1220) from the disease activity database (1225). These two pieces of data are used to draw two bar graphs to display the information simultaneously (1230). It is important to view both pieces of data at the same time, since a safe threshold may only be inferred from how UV dose affected disease activity in the past. The line corresponding to the current UV threshold is drawn across the UV dose graph (1240), which is shown in FIG. 19A via the horizontal line in the top graph, and the user is a given a visual cue of which days they exceeded their threshold by coloring bars above the threshold differently (1250) (as can be seen in the different highlighted areas above the line in the top graph in FIG. 19A, for an example). When the user moves the threshold by dragging the threshold line up or down (see FIG. 19B), the threshold line is re-drawn at the new threshold value (1245). If the user confirms their new threshold by tapping on a confirmation button (1295) (shown in FIG. 19B), this new threshold is saved in the UV threshold database (1245). This is an example of how a user can select a threshold, and also optionally change a threshold after it has already been set. This ability to control the threshold based on symptoms personalizes the threshold for each patient, providing much better care for the patient.

11. Accurate Estimation of Safe Amount of Time to Spend in Current Conditions

While the wearable device measures the aggregated UV dose, it is difficult for users to have a notion of how fast they are approaching safe limits of UV dose (which may be user-selected, as described herein). Thus, it is important that the system provide an estimate of how much time can be safely spent outside current weather conditions. The mobile device can provide this information, after the current UV dose has been wirelessly obtained from the wearable device. This time estimate needs to be accurate, because overestimating the time can have serious health consequences for the user, while underestimating the time deprives the user of valuable healthy UV.

We assume that the current UV dose ($D_{current}$) and current UV exposure ($I_{current}$) have been obtained from the wearable device, and a safe threshold ($D_{safe}$) for the UV dose is known, or has been pre-set by the user. Note that both the current and safe dose may be related purely to UVA, or UVB, or the combination of the two. The time to reach the dose limit ($T_{safe}$) can be estimated by solving the following equation:

$$D_{current} + \int_{t=0}^{T_{safe}} I(t)dt = D_{safe} \qquad \text{(Eq. 11.1)}$$

I(t) represents the UV exposure as a function of time. For accurate prediction of $T_{safe}$, we need to have an accurate estimate for this.

UV exposure varies with the solar zenith angle (U.S. Pat. No. 9,068,887) ($\varphi$), which in turn is a function of time (t) as well as the location. FIG. 21 shows the variation of UV index over a typical day. We fit a sinusoidal function to approximate this curve, which is also shown in the figure. This allows us to approximate the UV exposure as:

$$I(t) = I_{max} \sin \frac{\pi(t - T_{sunrise})}{(T_{sunset} - T_{sunrise})}, \quad \text{(Eq. 11.2)}$$

if $T_{sunrise} < t < T_{sunset} = 0$, otherwise where $T_{sunrise}$ and $T_{sunset}$ represent the times of sunrise and sunset respectively. The information for these times is readily available for a given location from internet APIs. The mobile device has access to both such internet APIs and the location of the device. The maximum UV exposure is estimated from the current UV exposure ($I_{current}$) by solving for the above equation at the current time ($t_{current}$).

$$I_{max} = \frac{I_{current}}{\sin \frac{\pi(t - T_{subrise})}{(T_{sunset} - T_{sunrise})}} \quad \text{(Eq. 11.3)}$$

By using this form of the function I(t) in Eq. 11.1, it is now possible to analytically solve for the safe amount of time ($T_{safe}$) that can be spent in current conditions. This estimate can be updated continuously as new readings for UV exposure are received from the wearable device. In order to guard against sudden fluctuations in UV, e.g., when a cloud goes over the sun, we also form an estimate for the current UV exposure based on a weighted average of previous samples (Eq. 11.4).

$$I_{current}(t_0) = a_0 I_{current}(t_0) + a_1 I_{current}(t_0 - T) + a_2 I_{current}(t_0 - 2T) + \ldots + a_n I_{current}(t_0 - nT) \quad \text{(Eq.11.4)}$$

Once this is calculated, this can be displayed on the mobile device to the user, to inform them of the amount of time that is safe to be spent in the current environmental conditions. If the user is detected to be indoors (e.g., using any of the environmental detection algorithms herein), then the time display can be dismissed and the mobile device can instead inform the user that they are safe from UV radiation.

An exemplary computer executable method for estimating the safe amount of time to spend in current UV conditions is shown in FIG. 22. The wearable device sends the values of current exposure (1300) and current dose (1310) using its wireless connection to the mobile device. The mobile device maintains a first-in-first-out (FIFO) queue (1320) to cache the past few values of UV exposure. From these values an average current exposure can be estimated (Eq. 11.4). The mobile device also looks up the user's pre-selected UV threshold from a database (1350) which might exist on the device or in the cloud. It also utilizes its internet connection to get sunrise and sunset times from a weather API (1360). With these pieces of information (1325, 1355, 1315, 1365), the mobile device computes the safe amount of time for the user to spend in current conditions (1330), by numerically solving Eq. 11.1. This information is then displayed to the user (1340) using the mobile device's visual interface.

One of the challenges for people suffering from UV sensitivity is the transition from one low-UV area or period to a high-UV season area or period because suddenly, they are susceptible to get a much higher daily UV dose than they used to, just a few days before the transition. This happens, for example, when someone travels from the northern to the southern hemisphere during winter or during the transition of winter to spring. In these situations, the skin and the immune systems are not accustomed to handling a much higher UV dose on a daily basis, leading to adverse events.

Current methods of selecting limits for UV doses are based on skin type. Such limit selection does not account for an individual's personal tolerance to UV, which may be different from the skin-type based limit, due to a medical condition. It also assumes that the tolerable limit remains the same across time, which has been shown to be an unsafe assumption above. This makes skin-type based limit selection at best limited, at worst dangerous for the people using them. Here, we show that methods that help users find, set or choose a daily limit for their UV dose based on at least one of their past UV exposure and symptoms. These methods are particularly suited to help them transition to a higher-UV exposure environment.

Systems such as those referenced herein with respect to FIGS. 1-22 (from U.S. Pat. App. Pub. 2016/0364131A1) enable users to set or choose a daily limit for their UV dose, and may be based on symptoms they have reported. These methods enable them to decide how much UV is tolerable to them based on how they felt. However, if users live in the northern hemisphere and set their daily limit of UV dose during the winter, users may not have experienced any symptom that helps them understand how much UV they can tolerate over a day. As these users transition from winter to spring, they may want to watch carefully their UV dose as they are subject to higher UV exposure.

Described herein are improved systems and methods that are adapted to visually present to users a particular percentile of the history of their daily UV dose (such as, for example without limitation, 90th percentile of the history of their daily UV dose) over a period of time, such as, for example without limitation, 30 days. Of course, the principle is the same to show another percentile over a different period of time for a UV dose over a different timeframe. The methods herein (which can be performed with one or more algorithms) can thus visually present or indicate to the user a percentile of the history of their daily UV dose. Labeling (or visually indicating) the region of UV doses above the 90% percentile (for example) as "dangerous" can be used as a visual cue to help or assist the user set a daily limit for their UV dose, as well as transitioning into higher-UV exposure areas or timeframes. As these users receive an increasing UV dose every day, their skin or immune system is getting used to receiving higher UV doses and the 90th percentile limit shifts up. If they were to experience an adverse event, they can naturally set their daily limit to a number lower.

An exemplary system and method for guiding or assisting the user to set their personal limit of UV dose is shown in FIG. 23 directly below. The steps shown in FIG. 23 can be performed with one or more algorithms across one or devices (e.g., a hand-held device, a wearable device with one or more sensors, a database). In this particular embodiment, the user is visually presented (such as on the display of a hand-held device) with a graph of their UV dose history, based on a pre-selected time step, such as a day or an hour. For the purpose of this example, we take the daily view as an example. This can be, but need not be, visually overlaid with a history of the user's symptoms, to provide a visual correlation of UV exposure to experienced symptoms. In this embodiment, the system is adapted to further visually present (using any variety of visual indicators such as drawing), on the UV exposure graph, a region indicative of a danger zone (or increased risk of adverse event(s)), corresponding to, in this embodiment, the 90th percentile of their exposure (see FIG. 24). In alternative embodiments, the entire danger zone region may not be visually filled in with the lines, but rather a horizontal line or other visual indicator could simply be used to indicate where the 90% (or other percent) is on the graph. A limit line ("current limit" in FIG. 23) is drawn on this graph to indicate the user's current UV dose limit. This user-adjustable dose limit line can be presented and controlled in the same manner as is described herein with reference to FIGS. 1-22. In an editable mode, the position of this limit line may be adjusted and the system can be adapted to provide a visual cue (e.g. the limit line can turn a different color), when the selected UV dose limit moves above the 90th percentile (or any other percentile).

The method shown in FIG. 23 is an exemplary method, and not all of the steps shown necessarily need to be performed. For example, steps 1220 and 1225 related to disease activity could be eliminated from the method, and the method could still visually present information indicative of a calculated percentile of the history of UV dose. Additionally, the order of some steps can be varied and need not be carried out in the exact order as shown.

FIG. 24 illustrates an exemplary visual presentation on a display of a device, such as a user hand-held device. Visual presentation 2400 includes a region 2401 that visually presents a history of UV dose, and optional region 2402 that visually presents information indicative of symptoms (e.g., user entered symptoms, such as in the methods set forth herein). Region 2401 visually presents in graph form UV dose over time, and in this embodiment, the dose is broken down per day, as is shown in region 2404 of region 2401. The history of UV dose can be calculated based on information sensed by a UV sensor in a wearable UV sensing device, such as using any of the methods and devices herein. Visual presentation 2400 also includes a percentile indicator, which is this embodiment includes percentile limit 2406 (e.g., in this embodiment it indicates the 90$^{th}$ percentile of dose). The percentile indicator also includes region 2407 (in this embodiment is a rectangular region), which can indicate a region of increase risk to the patient. In other embodiments, the percentile indicator could, for example, exclude region 2407, and could simply be a horizontal line 2406 indicating a percentile of dose. There are a wide variety of ways to visually present the percentile indicator.

Region 2401 also includes a user-adjustable UV dose threshold interface 2405, which is adapted to allow the user to interact with the user-adjustable UV dose interface and choose a user-chosen UV dose threshold quantity. User-adjustable interface 2405, and alternatives, are described else herein. For example, user adjustable interface 2405 can be a slidable line or bar that can be moved up or down on the display by the user, so the user can select (choose) a new UV dose threshold. Prior to being moved by the user, user-adjustable interface 2405 can also indicate a current, or existing, UV dose threshold.

Symptom region 2402 is optionally displayed, and can indicate symptoms 2411 over time 2410. Times 2410 can be broken down into the same increments as in region 2401, which may help a user correlate symptoms and UV dose.

As shown in FIG. 24, the history of UV dose is visually presented in graph form, showing UV dose over time. As is also shown in FIG. 24, the percentile indicator (comprising 2406 and 2407) is visually overlaid with the history of UV dose. As is also shown in FIG. 24, user-adjustable UV dose threshold interface 2405 is visually overlaid with the history of UV dose.

In some embodiments, the method can cause interface 2405 to change visually if interface 2405 is moved to a dose that is at least as high as 2406.

In some alternative embodiments, zone 2407 could instead be a region that is presented visually as being below 2406. The percentile indicator could then be considered to be indicative of a safer zone, rather than a zone of increased risk as is shown in FIG. 24.

FIG. 24 is an example of a computer executable method that visually presents on a display of a user device a percentile indicator indicative of a calculated percentile of a UV dose history that was calculated based on information sensed by a UV sensor in a UV sensing device.

Any of the computer executable methods herein may be performed on a wearable device (which in fact need not be worn, but could simply be placed next to a subject, such as on desk) or on a mobile device, or some parts of the computer executable methods may be performed on a wearable device while some parts are performed on a mobile device. The specific examples herein are illustrative.

The invention claimed is:

1. A computer executable method stored in a memory, comprising:
    visually presenting on a display of a user device in a first display region a history of ultraviolet (UV) dose that was calculated based on information sensed by a UV sensor in a wearable UV sensing device;
    visually presenting a percentile indicator on the display in the first display region, the percentile indicator being indicative of a calculated percentile of the history of UV dose, the percentile indicator indicating to a user doses on the history of UV dose that are at least one of at, above, and below the calculated percentile; and
    visually presenting on the display in the first display region a user-adjustable UV dose threshold interface to allow the user to manually interact with the user-adjustable UV dose threshold interface and choose a user-chosen UV dose threshold quantity.

2. The method of claim 1, wherein the history of UV dose is visually presented in graph form.

3. The method of claim 1, wherein the user-adjustable UV dose threshold interface changes visually if the user-adjustable UV dose threshold interface is moved manually by the user to a UV dose that is at least one of at, above, and below the calculated percentile, the visual change being different than the manual movement by the user.

4. The method of claim 1, wherein the percentile indicator comprises at least one of a horizontal line, a shaded area, and a colored area.

5. The method of claim 1, wherein the history of UV dose is broken up into epochs of time, optionally, days, weeks, or months.

* * * * *